(12) United States Patent
Fairchild et al.

(10) Patent No.: US 9,821,401 B2
(45) Date of Patent: Nov. 21, 2017

(54) HIGH TOUGHNESS WELD METALS WITH SUPERIOR DUCTILE TEARING RESISTANCE

(75) Inventors: Douglas P. Fairchild, Sugar Land, TX (US); Mario L. Macia, Bellaire, TX (US); Steven J. Ford, Missouri City, TX (US); Nathan E. Nissley, Houston, TX (US); Raghavan Ayer, Basking Ridge, NJ (US); Hyun-Woo Jin, Easton, PA (US); Adnan Ozekcin, Bethlehem, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 1016 days.

(21) Appl. No.: 13/997,610

(22) PCT Filed: Dec. 12, 2011

(86) PCT No.: PCT/US2011/064418
§ 371 (c)(1),
(2), (4) Date: Jun. 24, 2013

(87) PCT Pub. No.: WO2012/102794
PCT Pub. Date: Aug. 2, 2012

(65) Prior Publication Data
US 2013/0292362 A1 Nov. 7, 2013

Related U.S. Application Data

(60) Provisional application No. 61/437,384, filed on Jan. 28, 2011.

(51) Int. Cl.
*B23K 9/00* (2006.01)
*B23K 9/173* (2006.01)
(Continued)

(52) U.S. Cl.
CPC ............ *B23K 9/173* (2013.01); *B23K 9/0213* (2013.01); *B23K 33/004* (2013.01);
(Continued)

(58) Field of Classification Search
CPC ......... C22C 38/02; C22C 38/04; C22C 38/08; C22C 1/02; B23K 2203/04; B23K 33/004;
(Continued)

(56) References Cited

U.S. PATENT DOCUMENTS 3,201,233 A * 8/1965 Hull .................. B23K 35/3086
219/146.23
3,218,432 A 11/1965 Peck
(Continued)

FOREIGN PATENT DOCUMENTS

CN 1526032 9/2004
CN 101774070 7/2010
(Continued)

OTHER PUBLICATIONS

Bangaru, N.V., et al, (2004) "Microstructural Aspects of High Strength Pipeline Girth Welds," *Proceedings of the 4th International Pipeline Technology Conference*, Ostend, Belgium, May 9-13, 2004, pp. 789-808.
(Continued)

*Primary Examiner* — Dana Ross
*Assistant Examiner* — Joseph Iskra
(74) *Attorney, Agent, or Firm* — ExxonMobil Upstream Research Company—Law Department

(57) ABSTRACT

Weld metals and methods for welding ferritic steels are provided. The weld metals have high strength and high ductile tearing resistance and are suitable for use in strain based pipelines. The weld metal contains retained austenite and has a cellular microstructure with cell walls containing
(Continued)

lath martensite and cell interiors containing degenerate upper bainite. The weld metals are comprised of between 0.02 and 0.12 wt % carbon, between 7.50 and 14.50 wt % nickel, not greater than about 1.00 wt % manganese, not greater than about 0.30 wt % silicon, not greater than about 150 ppm oxygen, not greater than about 100 ppm sulfur, not greater than about 75 ppm phosphorus, and the balance essentially iron. Other elements may be added to enhance the properties of the weld metal. The weld metals are applied using a power source with current waveform control which produces a smooth, controlled welding arc and weld pool in the absence of $CO_2$ or oxygen in the shielding gas.

19 Claims, 11 Drawing Sheets

(51) Int. Cl.

| | | |
|---|---|---|
| B23K 9/02 | (2006.01) | |
| B23K 33/00 | (2006.01) | |
| B23K 35/30 | (2006.01) | |
| C22C 1/02 | (2006.01) | |
| B23K 103/04 | (2006.01) | |

(52) U.S. Cl.
CPC ...... *B23K 35/3053* (2013.01); *B23K 35/3066* (2013.01); *C22C 1/02* (2013.01); *B23K 2203/04* (2013.01)

(58) Field of Classification Search
CPC ............ B23K 35/3053; B23K 35/3066; B23K 9/0213; B23K 9/173
USPC ................... 219/74, 146.1, 146.23
See application file for complete search history.

(56) References Cited

U.S. PATENT DOCUMENTS

| | | | |
|---|---|---|---|
| 3,902,039 A | 8/1975 | Lang | |
| 4,336,441 A | 6/1982 | Godai et al. | |
| 5,523,540 A | 6/1996 | Coldren et al. | |
| 6,114,656 A * | 9/2000 | Fairchild | B23K 9/173 |
| | | | 219/137 R |
| 6,203,631 B1 | 3/2001 | Bowen et al. | |
| 6,251,198 B1 * | 6/2001 | Koo | C21D 1/19 |
| | | | 148/332 |
| 6,254,698 B1 | 7/2001 | Koo et al. | |
| 6,565,678 B2 | 5/2003 | Fairchild et al. | |
| 7,462,799 B2 | 12/2008 | Uttrachi | |
| 2002/0043305 A1* | 4/2002 | Fairchild | B23K 35/3066 |
| | | | 148/336 |
| 2004/0034608 A1 | 2/2004 | De Miranda et al. | |
| 2005/0155960 A1* | 7/2005 | Bonnet | B23K 26/1429 |
| | | | 219/137 WM |
| 2007/0289655 A1 | 12/2007 | Hamada et al. | |
| 2008/0057341 A1 | 3/2008 | Bouillot et al. | |
| 2008/0277398 A1 | 11/2008 | Wilson | |
| 2010/0089463 A1 | 4/2010 | Beeson et al. | |
| 2010/0136369 A1 | 6/2010 | Ayer et al. | |

FOREIGN PATENT DOCUMENTS

| | | |
|---|---|---|
| JP | 57-171598 | 10/1982 |
| JP | 60-099488 | 6/1985 |
| JP | 62-068694 | 3/1987 |
| JP | 7060483 A | 3/1995 |
| JP | 08-238572 | 9/1996 |
| WO | WO 2008/105990 | 9/2008 |
| WO | WO 2008/115320 | 9/2008 |
| WO | WO 2008/115323 | 9/2008 |

OTHER PUBLICATIONS

Broek, D, (1986), "Mechanisms of Fracture and Crack Growth", *Elementary Engineering Fracture Mechanics*, Fourth Edition, Chapter 2.
Cheng, W, et al, (2009) "Test Methods for Characterization of Strain Capacity—Comparison of R-curves from SENT/CWP/FS Tests", *Proceedings of 5th Pipeline Technology Conference*, Ostend, Belgium.
Fairchild, D.P., et al, (2008) "Girth Welds for Strain-Based Design Pipelines", *ISOPE Symposium on Strain Based Design*, the 18th International Offshore and Polar Eng. Conf, (ISOPE-2008), Vancouver, Canada, Jul. 6-11, pp. 48-56.
Gioielli, P.C., et al, (2007) "Large-Scale Testing Methodology to Measure the Influence of Pressure on Tensile Strain Capacity of a Pipeline", *Proceedings of 17th International Offshore and Polar Engineering Conference*, Lisbon, Portugal, 2007, pp. 3023-3027.
Gioielli, P.C., et al, (2008) "Characterization of the Stable Tearing During Strain Capacity Tests", *ISOPE Symposium on Strain Based Design*, the 18th International Offshore and Polar Eng. Conference, (ISOPE-2008), Vancouver, Canada, Jul. 6-11, pp. 86-89.
Hamada, I. et al. (2002), "Niobium-Added Type 308 Stainless Steel Weld Metal Resistant to Sensitization by Postweld Heat Treatment and Low-Temperature Aging", *Corrosion*, ProQuest Technology Collection, Jan; 58, 1, p. 82.
Kibey, S., et al, (2009) "Development of a Physics-Based Approach for the Prediction of Strain Capacity of Welded Pipelines", *Proceedings of 19th International Offshore and Polar Engineering Conference*, Osaka, Japan.
Kibey, S., et al, (2010) "Tensile Strain Capacity Equations for Strain-Based Design of Welded Pipelines", *Proceedings of the 8th International Pipeline Conference*, Calgary, Canada.
Koo, J. Y., et al, (2003) "Metallurgical Design of Ultra-High Strength Steels for Gas Pipelines," *ISOPE Symposium on High-Performance Materials in Offshore Industry*, the 13th International Offshore and Polar Eng. Conference, (ISOPE-2003), Honolulu, Hawaii, USA, May 25-30, pp. 10-18.
Minnaar, K., et al, (2007) "Predictive FEA Modeling of Pressurized Full-Scale Tests", *Proceedings of 17th International Offshore and Polar Engineering Conference*, Lisbon, Portugal, pp. 3114-3120.
Sampath, K. (2005) "Strengthening Materials Specifications", *Journal of Materials Engineering and Performance*, vol. 14(5), October, p. 596-603.
Shen, G.W., et al, (2009) "Measurement of J-R Curves Using Single Specimen Technique on Clamped SE (T) Specimens", *Proceedings of 19th International Offshore and Polar Engineering Conference*, Osaka, Japan, pp. 92-99.
Tang, H., et al, (2010) "Development of the SENT Test for Strain-Based Design of Welded Pipelines", *Proceedings of 8th International Pipeline Conference*, Calgary, Canada, 2010.
Wang, X., et al, (2009) "Validation of Strain Capacity Prediction Method—Comparison of Full-Scale Test Results to Predictions from Tearing Analysis Based on Fea", *Proceedings of 5th Pipeline Technology Conference*, Ostend, Belgium.
PCT/US2011/064418 International Search Report, dated Apr. 18, 2012.
Hertzberg, R. W.; (1995) "Microstructrual Aspects of Fracture Toughness" *Deformation and Fracture Mechanics of Engineering Materials*, Fourth Edition, Chapter 10.

\* cited by examiner

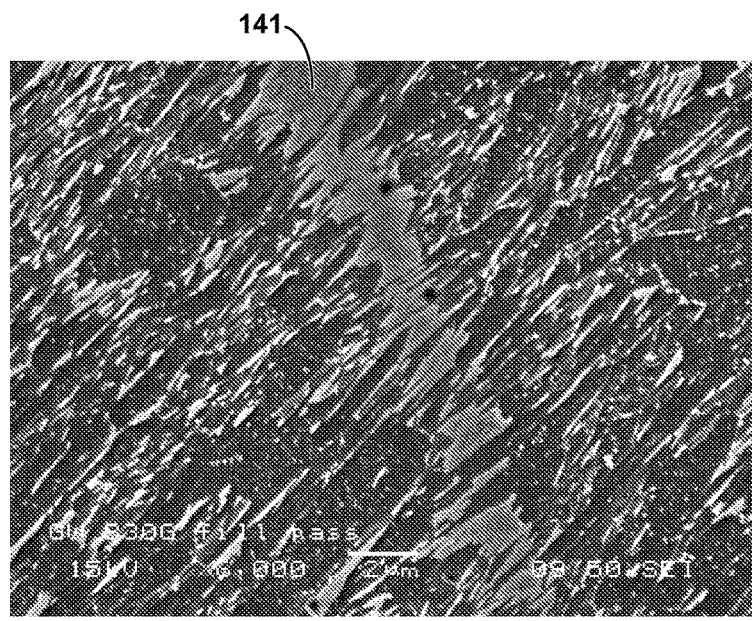
FIG. 14
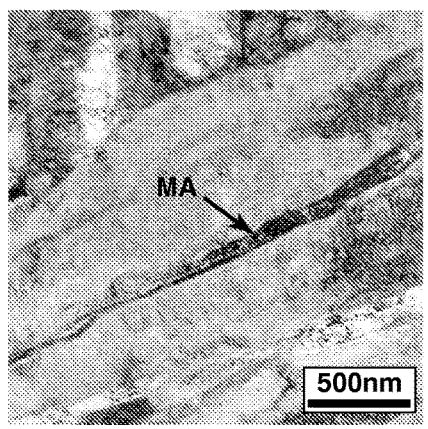 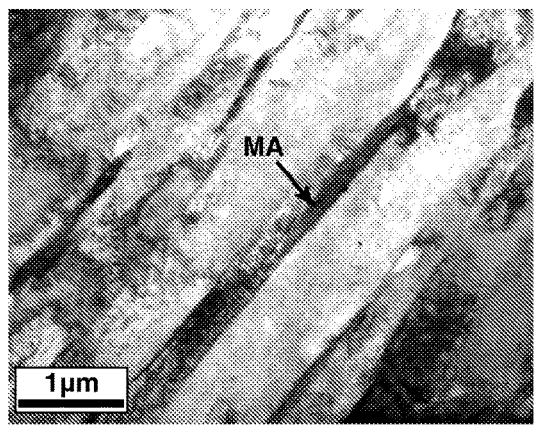
FIG. 15A  FIG. 15B

HIGH TOUGHNESS WELD METALS WITH SUPERIOR DUCTILE TEARING RESISTANCE

CROSS-REFERENCE TO RELATED APPLICATION

This application is the National Stage of International Application No. PCT/US2011/064418, filed 12 Dec. 2011, which claims the priority benefit of U.S. Provisional Patent Application 61/437,384 filed 28 Jan. 2011 entitled HIGH TOUGHNESS WELD METALS WITH SUPERIOR DUCTILE TEARING RESISTANCE, the entireties of which are incorporated by reference herein.

FIELD OF THE INVENTION

This invention relates to the field of welding metals. More particularly, the invention relates to materials and methods for producing weld metal having high strength and high toughness.

BACKGROUND

This section introduces various aspects of the art, which may be associated with exemplary embodiments of the present invention. This discussion will assist in providing a framework to facilitate a better understanding of particular aspects of the present invention. This section should be read in this light, and not necessarily as admissions of prior art. In the following specification, the invention is described in the context of strain-based design of pipelines. However, the invention is clearly of wider application to any situation in which a high strength, high toughness weldment is desirable, including but not limited to any non-pipe weldments of any one or more steel materials. Various terms are defined in the following specification. For convenience, a Glossary of terms is provided immediately preceding the claims.

With respect to applied loads, design standards, and material performance requirements, traditional pipelines are designed to prevent the pipeline materials from experiencing significant plastic strains. This type of design is referred to as allowable stress design or stress-based design. In stress-based designs, the loads applied to the materials are typically limited to some fraction of the yield strength of the construction. While in some cases, local plasticity might occur in a stress-based-designed pipeline at small stress concentrations like weld toes (i.e., over dimensions of several millimeters), generally stress-based designs are not intended for situations where large areas (many inches or feet) of the pipeline are subjected to plastic strains.

Today, pipelines are being designed for increasingly hostile service environments. For some demanding environments such as discontinuous permafrost, seismic, iceberg scouring, etc. where service temperatures can range as low as −20° C. or lower, there is a need to design and build pipelines capable of withstanding some degree of plastic deformation. In such cases, the deformation is largely oriented parallel to the pipe axis (i.e., longitudinal plastic strains) and the applied loads are often described in terms of applied global strains which are experienced over many inches or possibly feet of pipeline material. Strain-based design (SBD) is the term used to describe designing/constructing a pipeline that is capable of incurring longitudinal plastic strains. Typical strain magnitudes for strain-based designs are generally defined as global plastic strains in excess of 0.05%. Global plastic strains are defined as strains measured along a length of pipe and straddling the weld or welds in question that are not local but are spread over a distance of many inches or feet. In the case of an oil or gas pipeline, for example, global plastic strains for strain-based design purposes could be in reference to a section of the pipeline that is about two pipe diameters in length, although other similar definitions could be used to define global plastic strains. Using this convention, a global plastic strain of one percent in a 30 inch diameter pipeline would produce about 0.6 inches of strain in two diameters of length; i.e., 60 inches in length.

Fracture mechanics techniques called engineering critical assessment (ECA) are used to judge the structural significance of defects in girth welds for stress-based design pipelines. ECA includes accepted practices for testing materials, qualifying welds, and assessing the significance of weld imperfections in stress-based designs. Strain-based design (SBD) is not as mature a field as traditional stress-based design, and as of 2010, fully validated ECA practices for SBD have not been widely accepted by the pipeline industry. However, ECA principles are applicable to SBD. Many aspects of SBD pipeline engineering have been published at recent international conferences. Several notable venues include the Conference of Pipeline Technology in Belgium, the International Pipeline Conference in Canada, and the annual conferences of The International Society of Offshore and Polar Engineers (ISOPE) and The Offshore Mechanics and Arctic Engineering Society (OMAE). ExxonMobil has published numerous articles at these conferences including topics such as prediction methods for girth weld defect tolerance under SBD loading conditions, full-scale pipe testing for SBD engineering, fracture mechanics test methods, and girth welding technology useful in SBD applications. These publications in combination with patent applications International Application Numbers PCT/US2008/001753 (WIPO Patent Application WO/2008/115323, A Framework To Determine The Capacity Of A Structure) and PCT/US2008/001676, (WIPO Patent Application WO/2008/115320, Method To Measure Tearing Resistance) provide the background necessary for strain-based design engineering critical assessment (SBECA) technology to one skilled in the art.

Depending on the service temperature and applied loads, common structural steels and welds can experience either brittle or ductile fracture. Ductile fracture occurs at higher temperatures and brittle (or "cleavage") fracture occurs at lower temperatures. At some intermediate temperature range, a transition occurs between ductile and brittle fracture. This transition is sometimes characterized by a single temperature called the ductile-to-brittle transition temperature (DBTT). The DBTT can be determined by use of the Charpy V-notch or CTOD test, depending on the application.

In stress-based design applications materials engineering and pipeline design practices are focused on ensuring adequate brittle fracture resistance and little attention is paid to ductile fracture of the girth welds. Brittle fracture is mitigated by specifying a minimum design temperature (consistent with the lowest anticipated service temperature) and using test methods like the Charpy V-notch or crack tip opening displacement (CTOD) test to qualify materials.

In the newer application of SBD pipelines, however, it is necessary to go beyond the simple consideration of brittle fracture; ductile fracture of the girth welds must also be considered. Girth welds are usually considered potentially the weakest link due to the common presence of degraded microstructures and imperfections caused by welding. In strain-based design, the designer, through choice of materials, welding, and inspection technology, will mitigate brittle fracture, or at least to delay it until well into the plastic loading regime and beyond the designed strain demand. During plastic loading of a pipeline, ductile tearing can initiate at girth weld defects. Depending on such factors as the strength properties and ductile tearing resistance of the welds, defect size, and pipeline base steel, the amount of tearing can be minimal and stable. If stable, the amount of defect growth typically ranges from a few microns up to a millimeter or two. If this degree of growth can be reliably accounted for in strain-based pipeline engineering practices, and specifically SBECA procedures, then pipeline integrity can be quantified and managed. For these reasons, overmatched girth welds with good ductile tearing resistance are important for SBD pipelines.

Naturally, there is an inherent tradeoff between strength and toughness in structural steels and weldments. As strength increases, toughness generally decreases. SBD requires both higher strength and higher toughness. A primary challenge for SBD pipelines is how to obtain both high strength and high toughness in the girth welds. The properties of pipeline girth welds are primarily controlled by the microstructure, which is in turn controlled by the chemistry and thermal cycle imposed during welding. Chemistry is mostly controlled by the base material of the pipe and selection of the welding consumables (wire, shielding gas, and/or fluxes). The weld thermal cycle is primarily a product of the weld procedure and base material thickness.

One potential consideration to obtain adequate toughness is use of highly alloyed (e.g., Ni-base alloys) welding filler wires because increasing nickel content generally creates toughness improvement. This approach has been used in cryogenic applications such as the welding of 9% Ni steel. There are two problems with this approach. The first is that the weld metals in such welds have an austenitic microstructure and are inherently weak. When welding 9% Ni steel, the austenitic welds are notably weaker than the base metal and the designs are typically de-rated according to the strength achieved by the Ni-base welds rather than the full strength of the 9% Ni steel. Although these Ni-base wires are not currently used for oil and gas pipelines, if they were considered for use due to their good toughness properties, they would only generate strengths useful for pipe grades up to about X60. Secondly, Ni-base filler wires are problematic for welding structural steels because high Ni weld metals are viscous when molten and difficult to weld. Once nickel content exceeds about five wt %, the viscosity of the weld metal can be noticeably higher. The poor fluidity of the viscous weld metal increases the chance of creating weld defects. This is particularly problematic for mechanized 5G pipeline girth welds where the constantly changing weld position and tight bevels creates a challenging situation that demands a good wetting, smooth operating, welding method.

U.S. Pat. Nos. 3,218,432 and 3,902,039 describe the above approach to achieve higher strength cryogenic welds as compared to typical austenitic (Ni-base) welds. These patents disclose ferritic filler wires comprising about 9-12 wt % Ni. These ferritic wires will hereafter be referred to as Fe—Ni wires and the associated welds, Fe—Ni welds. When used to weld 9% nickel steel the welds are stronger than welds in 9% Ni steels made using Ni-based alloys. Filler metals based on the teachings of these two patents have been commercialized, however they are rarely used. In order to achieve good cryogenic toughness, the Fe—Ni welds must be made using the gas tungsten arc welding (GTAW) process with low heat inputs and strict welding controls must be maintained, and these welds are difficult to make out of position because of the viscous weld metal. Controls are necessary to minimize weld metal oxygen content (related to toughness) and weld defects such as porosity, hot cracking, and lack of fusion. Many fabricators of cryogenic structures are unwilling to operate under these restrictions, believing that reliability may be unmanageable and productivity will be poor. While the use of Fe—Ni welds can theoretically achieve toughnesses suitable for cryogenic applications, Ni-based austenitic wires continue to be the most commonly used welding consumable for cryogenic applications despite the drawback of low strength.

An important difference to remember between cryogenic welding and the present invention is that cryogenic welded designs are distinctly stress-based and the materials are designed to prevent brittle fracture. Cryogenic designs operate at stresses well below the yield strength of the engineering alloys. Ductile fracture and tearing resistance are not a consideration for cryogenic design and the aforementioned Fe—Ni welding techniques were not purposefully designed to produce good ductile fracture resistance.

One approach to producing steel pipe welds that are useful for strain-based design is disclosed in U.S. Patent Application Publication No. US PA 2010/0089463, published Apr. 15, 2010 (International Patent Application PCT/US2008/001409) which discloses the use of austenitic filler wires to weld pipe for strain-based pipeline designs. The publication teaches the production of high toughness welds using Ni-based alloy, stainless steel, or duplex stainless steel welding consumables. This invention is hereafter called the "austenitic SBD weld". This publication teaches away from ferritic weld metals in that it states conventional ferritic welds have limitations in toughness and tearing resistance that restrict the amount of strain that can be accommodated in structural design. A weld that achieves toughness suitable for SBD applications, but is significantly stronger than the austenitic SBD weld is disclosed in this application below.

When austenitic welds are applied to ferritic steels, a dissimilar atomic structure weld interface is created at the boundary between the weld metal and the weld heat affected zone (HAZ). Austenite possesses a face centered cubic (fcc) structure and ferrite possesses a body centered cubic (bcc) structure. Application of ultrasonic testing/inspection to dissimilar interfaces for defects such as lack of fusion can be difficult because this interface produces sound reflections that can be misinterpreted. Fcc and bcc materials have different sound propagation properties and respond differently to ultrasonic inspection. For challenging applications like SBD, it is desired to inspect for small defects with a tolerance on the sizing accuracy on the order of a millimeter. Dissimilar weld interfaces can cause signals during UT inspection that rival the signals created by small defects or at least create uncertainties in sizing accuracy. This is particularly the case for signals that emerge from a dissimilar weld in an area of the heat affected zone that has other geometric complexities like cusps or scallops between adjacent weld beads or in areas where the weld bevel geometry has changed. For the above reasons, it is desirable that ferritic steel pipelines be joined with ferritic welds to avoid dissimilar weld interface and enable accurate inspection when using UT inspection.

There is a need for weld metal that simultaneously produces high strength, high ductile fracture resistance, and good brittle fracture resistance (i.e., good ductile and brittle fracture toughness) and that can be applied during pipeline field construction without undue concern regarding "weldability" or ease of use in terms of weld pool control and defect rates.

The present invention comprises a ferritic weld produced by a ferritic welding consumable that achieves high toughness and tearing resistance, even at low temperatures. The invention provides exceptional strain hardening capacity, excellent defect tolerance, and high strain capacity in SBD applications, and provides excellent weldability, high strength, and accurate ultrasonic inspection.

SUMMARY

A novel weld metal and method is provided that achieves high strength welds with superior ductile tearing resistance. This weld metal comprises between 0.02 and 0.12 wt % carbon, between 7.5 and 14.5 wt % nickel, not greater than about 1.00 wt % manganese, not greater than about 0.30 wt % silicon, not greater than about 150 ppm oxygen, not greater than about 100 ppm sulfur, not greater than about 75 ppm phosphorus, and the balance essentially iron. Other elements that may be added to enhance weld metal properties comprise: not greater than about 0.40 wt % Mo, not greater than about 0.30 wt % Cu, not greater than about 0.30 wt % Cr, not greater than about 0.04 wt % V, not greater than about 0.04 wt % Nb, not greater than about 0.02 wt % Ti, not greater than about 0.02 wt % Zr, not greater than about 20 ppm B. The carbon content and other alloys of the weld metal may be adjusted within the range to provide welds with sufficient strength for pipe grades X52 to X120 or higher. A method for applying the weld metal uses welding equipment and parameters that enable control of weld metal oxygen content and means for controlling weld arc stability and weld pool flow characteristics such as viscosity to provide acceptable weldability. The weld metal of the invention has a microstructure comprising cell walls and cell interiors wherein the cell walls comprise 50% or more lath martensite, the cell interiors comprise 20% or more degenerate upper bainite, and the entire weld volume fraction contains more than a trace amount of retained austenite.

DESCRIPTION OF THE DRAWINGS

FIG. 14 is a scanning electron micrograph showing the microstructure at a cell wall in a Fe—Ni weld.

FIGS. 15A and 15B are transmission electron micrographs of degenerate upper bainite showing several parallel laths and discontinuous MA at lath boundaries.

FIG. 18A shows stacking faults inside the retained austenite. FIG. 18B shows retained austenite within a granular bainite microstructure.

DETAILED DESCRIPTION OF THE INVENTION

Figure 1:
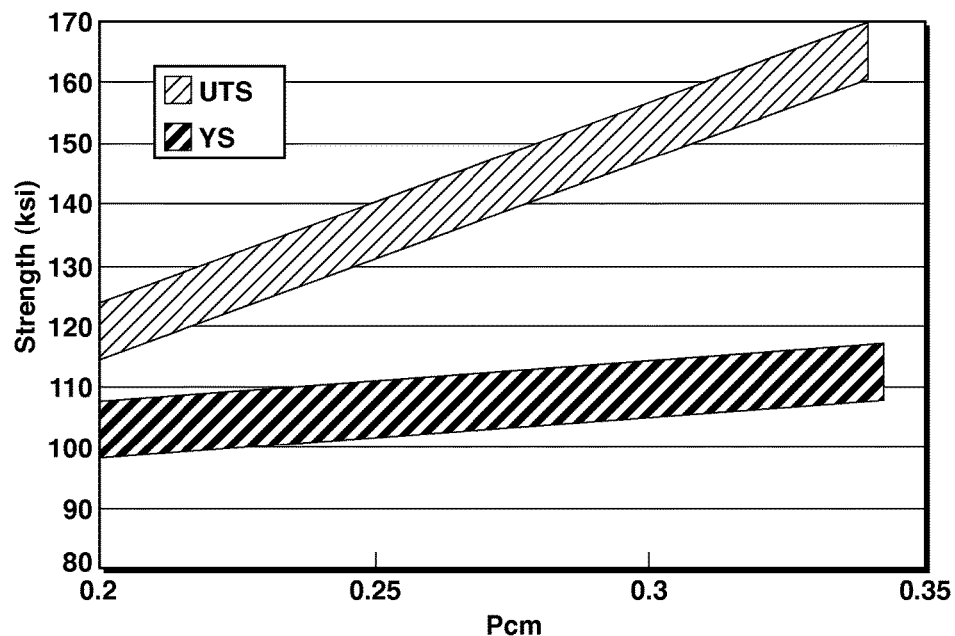
FIG. 1 is a graph of Pcm versus weld metal yield strength and ultimate tensile strength for a range of compositions of the novel weld metal of the invention.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. The invention is not limited to the specific embodiments described below, but rather, it includes all alternatives, modifications, and equivalents falling within the spirit and scope of the appended claims.

The weld metal of this invention may be referred to as Fe—Ni or Fe—Ni martensite weld metal. The resulting welds may be referred to as high strain welds or HSWs.

An embodiment of the invention comprises a ferritic Fe—Ni weld metal that is applied using a modern gas metal arc welding (GMAW) process with power source current waveform control sufficient to adequately produce a smooth, controlled welding arc and weld pool in the absence of $CO_2$ or oxygen in the shielding gas. This produces a ferritic microstructure useful for SBD pipeline girth welds that are capable of simultaneously achieving good low temperature toughness, excellent ductile tearing resistance, and high strength.

The weld metal of the invention produces adequate strength and toughness for girth welds in strain-based design pipelines. These novel welds are suitable for SBD pipelines in pipe grades up to X120 and these welds can be applied during field construction with acceptable weldability. The weld metal desired for a particular application is designed through choice of the weld metal chemistry and the welding method (process and procedure) and can be applied in conditions of rugged field pipeline construction to produce suitable weld microstructure and mechanical properties.

The weld metal comprises:
between 0.02 and 0.12 wt % carbon,
between 7.5 and 14.5 wt % Ni,
not greater than about 1.0 wt % Mn,
not greater than about 0.30 wt % Si,
not greater than about 150 ppm oxygen,
not greater than about 100 ppm sulfur,
not greater than about 75 ppm phosphorus, and
the balance is Fe.

While the balance of the weld metal composition is iron, it is possible the weld metal may include other unlisted components, for example impurities or the like.

Other elements may be added for the reasons outlined below: not greater than about 0.40 wt % Mo, not greater than about 0.30 wt % Cu, not greater than about 0.30 wt % Cr, not greater than about 0.04 wt % V, not greater than about 0.04 wt % Nb, not greater than about 0.02 wt % Ti, not greater than about 0.02 wt % Zr, not greater than about 20 ppm B. All percentages herein relating to composition of the weld metal are expressed in wt % (weight percent).

Carbon is added to the chemistry as the primary strength controlling element. Mn is added as a deoxidizer, yet it also contributes solid solution strengthening and general hardenability. Ni is added for its positive influence on toughness. It also contributes to solid solution strengthening and hardenability. Mo, Cu, and Cr can be added to boost strength in the solid solution and through hardenability. Si is added in only small amounts depending on the application. Its function is primarily as a deoxidizer and to improve weld pool fluidity, which helps prevent weld defects. However, Si also degrades toughness through the formation of oxide inclusions. Therefore, depending on the tradeoff between toughness and weldability, Si can be optimized by the user. If toughness requirements are moderate and good toughness is only needed at, say, 0° C., but out-of-position weldability is desired, then up to about 0.3 wt. % can be added. If, on the other hand, toughness requirements are demanding, and good toughness is required at −100° C., and out-of-position welding is not a primary motivation, then Si can be added in smaller amounts such as zero to 0.1 wt. %.

V, Nb, and Ti can be added for precipitation strengthening additions. They combine with carbon and/or nitrogen to form small carbides, nitrides, or carbonitrides in the weld as a result of multipass welding. V and Nb can also contribute a small amount to hardenability and strength. Ti and Zr combine primarily with oxygen in the molten weld pool, forming small oxides that pin prior austenite grain boundaries and reduce grain size during cooling from high welding temperatures. Ti and Zr have a high affinity for oxygen and combine with oxygen at high temperatures promoting the formation of very small inclusion nuclei. This promotes the formation of small, finely dispersed oxides in the weld metal. Boron is a powerful strengthening agent. It can be added to boost strength through interstitial strengthening and hardenability.

Oxygen, sulfur, and phosphorus are impurities and are not intentionally added. Efforts are made to limit these elements in the weld. Oxygen is controlled to a great degree by the welding shielding gas composition when the HSWs are applied with a gas shielded process. For example, it would be typical to weld the HSWs with a completely inert shielding gas mixture of He and Ar. It might also be advantageous, depending on the welding equipment, to use a large gas cup, diffuser, or trail shield to enable better gas coverage. Efforts to reduce oxygen also include cleaning of the weld bevel (no rust or oily contaminants) and keeping the welding wire stored and covered to prevent moisture or rust deposits on the wire. In general, the HSWs are applied using a welding process that controls oxygen in the welding environment in order to minimize oxygen in the weld pool.

Depending on application and the required weld strength, the weld metal composition can be adjusted within the noted ranges to suit pipeline grades from X52 to X120. A wide variety of base metal yield strengths can be accommodated from about 50 ksi to about 140 ksi. The carbon content is most influential for adjusting strength, although other alloys can provide some strength adjustments as well. Lower strengths are achieved with carbon contents of about 0.02 wt % while the highest strengths are obtained with carbon contents of about 0.12 wt %. By adjustment of carbon and other alloys, yield strengths up to about 150 ksi and tensile strengths of up to about 160 ksi are possible. FIG. 1 shows a graph of Pcm versus weld strength for the yield strength (YS) and ultimate tensile strength (UTS) for a range of compositions of the novel weld metal. Pcm is a hardenability measure that can be used to predict strength and the user can adjust chemistry according to this Pcm data to select a HSW for a particular application.

High toughness is also achievable, even for the highest strengths reached by the HSWs. Upper shelf Charpy energy can be achieved down to liquid nitrogen temperatures and excellent CTOD (crack tip opening displacement) toughness can be achieved down to −60° C. and, depending on welding procedure and weld metal oxygen content, even down to −120° C.

Figure 2:
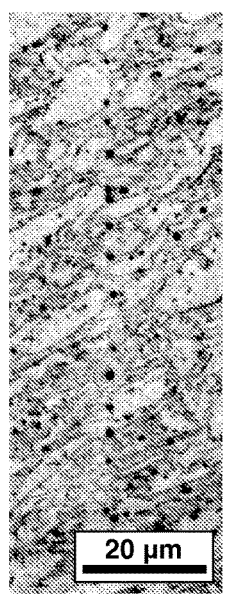
FIG. 2 is an optical micrograph showing inclusions located preferentially at a cell wall in a Fe—Ni weld microstructure.

Due to the low solubility of oxygen in steel welds, non-metallic inclusions are an important aspect of the metallurgical design. Whereas conventional pipeline welds are typically produced with large populations of weld metal inclusions, often by design, the HSWs are designed to limit inclusions. In general, weld metal inclusions degrade both the brittle and ductile fracture toughness of the Fe—Ni microstructures provided. The mechanism of low ductile fracture tearing resistance is clear due to the distribution of the inclusions at the cell walls as shown in FIG. 2. Due to chemical segregation and the kinetics involved during cell formation, non-metallic inclusions tend to form at the cell walls in Fe—Ni microstructures. Because these inclusions tend to line up along cell walls, a preferential path for ductile tearing is inevitable and is located at the position where the strongest microstructures (predominantly martensite) form. Due to the tendency to form inclusions along a particular path within the microstructure, the ductile tearing resistance in Fe—Ni microstructures is very sensitive to inclusions. Because oxygen promotes such inclusions, reduction or elimination of oxygen from the weld metal is important.

The High Strain Weld metal chemistry desired can, in combination with the base metal chemistry, be used to calculate the necessary consumable weld wire composition. The HSW chemistry can be applied to a wide variety of base metals simply by alteration of the weld wire chemistry and knowledge of the welding process that controls the amount of penetration and base metal dilution. As is known to those skilled in the art of welding engineering, dilution calculations can be used to determine one of three chemistries when two of the chemistries are known or specified. In the case of welding structural steels, there are three metals involved; the base metal, the weld metal, and the filler wire. For the application of 5G mechanized pipeline girth welding, dilution is typically 10% to 20% for the majority of the weld passes. Dilution calculations are known in the art and are explained in a number of welding engineering textbooks including Welding Metallurgy, Volume 2, Third Edition, by George E. Linnert that was published by The American Welding Society.

The two primary challenges to producing the high strain welds of the invention are (1) limiting weld metal oxygen content and (2) limiting weld defects resulting from high weld metal viscosity. Limiting oxygen content is an important objective because, as described above, the Fe—Ni weld metal is sensitive to the presence of non-metallic inclusions. As long as the non-metallic inclusion content is low, the Fe—Ni weld metal can provide excellent ductile fracture resistance and low temperature toughness. For the least demanding applications, the HSWs can be produced with up to about 150 ppm oxygen. For more demanding applications, the oxygen content can be controlled to less than 100 ppm. For even more demanding applications, the oxygen content can be controlled to less than about 75 ppm. If even higher levels of toughness are needed, then the oxygen content can be limited to less than 50 ppm. For the most demanding applications, the oxygen can be controlled to less than 25 ppm. Typically, such oxygen levels are only achievable by using the tungsten inert gas (TIG) welding process and a shielding gas comprised of mostly Argon or an Argon-Helium (Ar—He) mixture. While the TIG welding technique can deliver the desired metallurgy and excellent properties, it is slow, inefficient, and unsuitable for rugged field welding conditions. TIG welding is not a good candidate for broad-scale structural steel fabrication and certainly not for pipeline fabrication.

Figure 3:
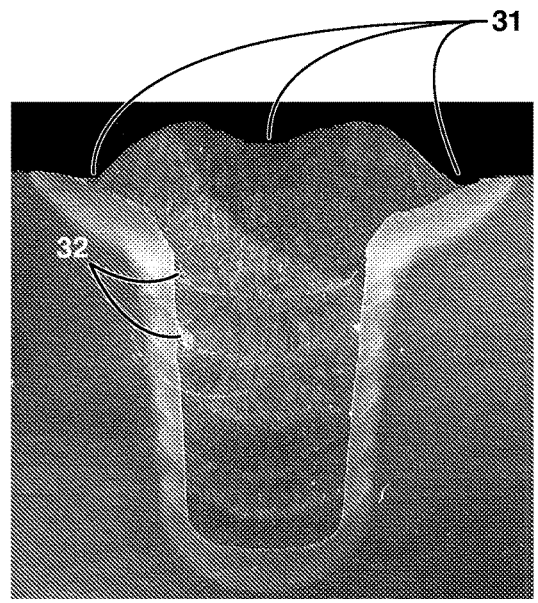
FIG. 3 is an optical macro image of a cross section of a Fe—Ni weld illustrating weld contour deficiencies and fusion defects.

Limiting weld defects is the other principal challenge. Because of the high Ni content of the Fe—Ni weld metal compared to typical C—Mn pipeline welds, it is more viscous when molten than typical pipeline weld metals and thus challenging to apply using traditional welding techniques. The poor weld metal fluidity makes it difficult to produce smooth transitions between the weld edges and the base metal. This is often associated with high surface tension (high viscosity) whereby the junction between the weld metal and base metal is characterized by a sharp angle sometimes referred to as a reentrant angle. These regions (also called the weld toes) can be the location of lack of fusion defects. FIG. 3 is a weld cross section that illustrates fusion defects: weld contour deficiencies 31 and weld defects 32. The weld of FIG. 3 was an attempt to produce the weld metal of this invention that was made using older (about year 2000) pulsed gas metal arc welding machine technology. Despite the fact that the welding was only conducted in the 1G (flat) position, the figure shows that weld penetration is poor and weld defects such as lack of fusion and surface contour deficiencies are present making this weld unacceptable for SBD or HSW purposes. A typical welding solution for such poor viscosity weld metals would be to use welding shielding gases containing $CO_2$ or oxygen. These gases reduce the surface tension of the weld metal and smooth out the molten weld pool. These gases also produce better arc stability which has the effect of creating a smoother weld pool and better weldability. $CO_2$ and oxygen are generally not an option for the Fe—Ni weld process because a significant amount of weld metal oxygen would result, causing high non-metallic inclusion content and thus degraded toughness.

The two primary challenges in applying the Fe—Ni weld metal can be solved with recently developed welding technology. One embodiment of the invention utilizes recent advancements in the electronic control of gas metal arc welding (GMAW) machines to enable effective application of the Fe—Ni weld metal. The GMAW process is a typical choice for field pipeline welding because it is rugged and efficient; however, traditional GMAW equipment requires the shielding gas contain a significant quantity of either $CO_2$ or oxygen to achieve good weldability, i.e., good arc stability, weld pool fluidity, and low defect rates.

GMAW welding machines have recently become available that enable smooth welding of the viscous Fe—Ni weld metal without $CO_2$ or oxygen in the shielding gas. Using sophisticated solid state electronics, some manufacturers of GMAW power sources have recently incorporated advanced pulsed waveform control to improve weldability. This type of welding is generically referred to as pulsed GMAW or PGMAW. The American Welding Society has designated this process as GMAW-P. Although PGMAW machines have been in existence for many years, only recently have waveform controls in these machines become advanced enough to enable high strain welds of the Fe—Ni type. The inventors have determined that the newer pulsed waveform welding machines enable low oxygen content and reduced defect potential in spite of the Ni content of the Fe—Ni weld.

Figure 4:
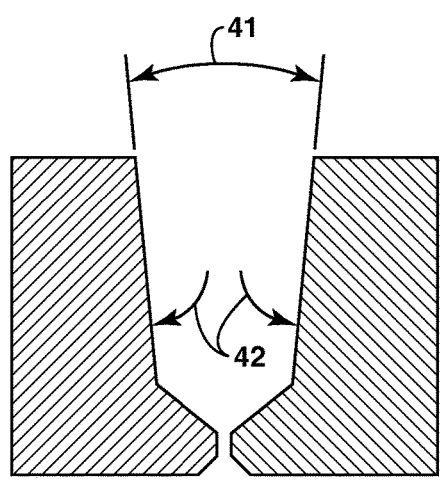
FIG. 4 is a cross sectional drawing of a CRC bevel.

For mechanized pipeline girth welding in which the welding head orbits around the circumference of the pipes being joined, the HSWs can be deposited in a narrow groove bevel preparation, a weld design known to those skilled in the art of structural or pipeline welding. Narrow bevels may be of a single or compound bevel design whereby the primary bevel is typically of an included angle from about 0° to about 20°. One common pipeline bevel design is shown in FIG. 4, which is sometimes called a CRC bevel, a design pioneered by CRC Evans Automatic Welding, which illustrates the included angle 41 and the primary bevel surfaces 42.

The novel HSW microstructure can also be deposited in an "open" weld bevel as known to those skilled in the art of structural or pipeline welding. Open bevels can have included angles from about 20° up to about 60°. Open bevels are often used for tie-in welds, repair welds, and insertion of replacement pipe sections. The HSW microstructure can also be deposited as a fillet weld or any other weld configuration depending on the application.

Figure 5:
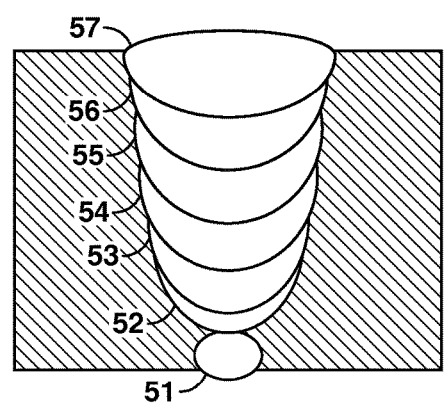
FIG. 5 is a cross sectional drawing of an embodiment of the high strain weld of the invention.

FIG. 5 is a schematic cross section of an embodiment of the HSW produced using seven passes 51 through 57. Depending on the application, HSW technology can be used for all weld passes or for only some weld passes; if the resultant weld achieves a desired high strain capacity, it can be termed a HSW. For example, mechanized pipeline welds are sometimes made where the root pass (pass number 51 in FIG. 5) is deposited from the inside of the pipe using an internal welding machine. This internal weld bead is typically very small. In one embodiment of a HSW, the internal root pass can be applied using a conventional welding wire and procedure while the remainder of the passes are applied using the Fe—Ni consumable wire and chemistry. It can be advantageous to apply the first two passes (root and hot pass) using conventional technology to reduce the risk of root defects, and then apply the remaining passes with the HSWs to produce the Fe—Ni chemistry. An advantage of a HSW is the combination of strength and toughness properties, so depending on the specific structural application and constraints regarding economic construction scenarios, HSWs can be applied in a variety of ways to suit the intended purpose.

Welding Process and Procedure Using GMAW

Figure 6:
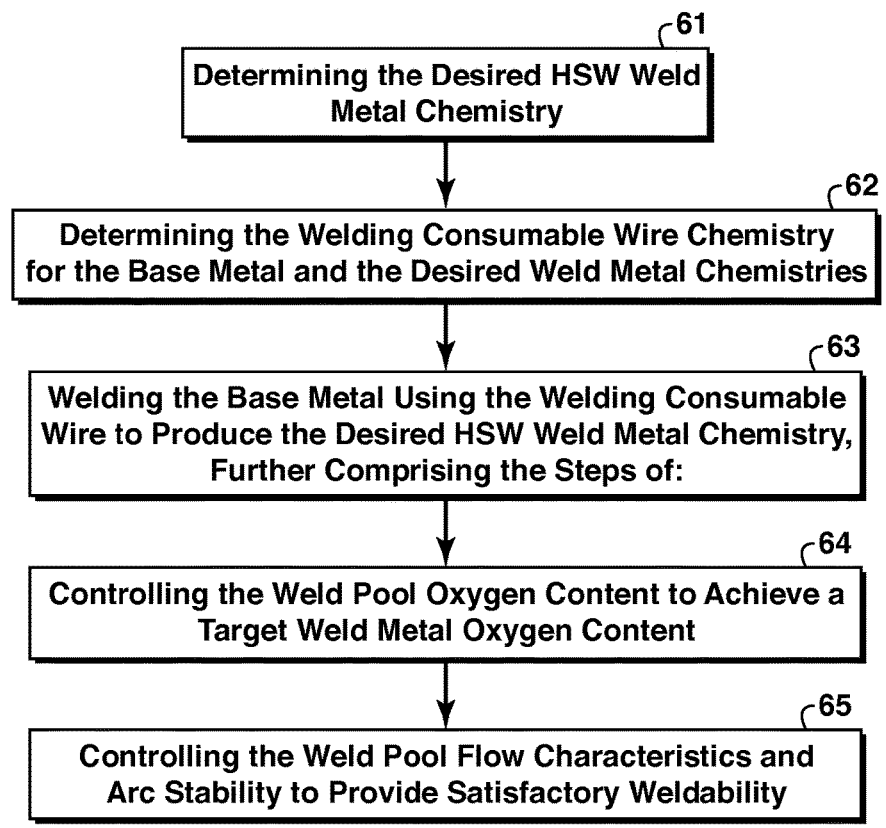
FIG. 6 is a drawing illustrating a method of welding ferritic steel pipelines of the invention.

One embodiment of the invention comprises a method of producing HSWs for given design conditions. With reference to FIG. 6, the method comprises determining the desired HSW weld metal chemistry 61 within the effective ranges disclosed herein. The method also includes the step of determining the welding consumable wire chemistry given the base metal chemistry and the desired weld metal chemistry 62. This step may comprise performing dilution calculations as discussed previously. The method further comprises welding the base metal using the welding consumable wire 63, including the step of providing means for controlling the weld pool oxygen content during welding to achieve a target weld metal oxygen content 64 and the step of controlling the arc stability and weld pool flow characteristics during welding to provide satisfactory weld fusion 65. The step of controlling the weld pool oxygen content may comprise cleaning or shielding the weld from elemental oxygen as well as other oxygen-containing compounds and may include providing a low-oxygen or substantially oxygen free welding shielding gas or flux. Substantially oxygen free means no oxygen or oxygen containing gas or material is intentionally added to the shield gas or other material. Such shield gas is substantially oxygen free even if it contains small amounts of oxygen in the nature of an impurity. The step of controlling the arc stability and weld pool flow characteristics such as viscosity may comprise use of a modern pulsed power supply GMAW welding machine with current waveform control adjusted to permit acceptable weldability of the HSW. This step may include other welding apparatus and techniques such as provided below.

For field pipeline construction, the HSWs are preferably made using the GMAW-based processes, and particularly PGMAW, although other processes can be used provided that the specified chemistry and microstructure are achieved and the weldability is satisfactory for the application. Due to the sensitivity of the HSWs to weld metal oxygen content and non-metallic inclusions, a preferred welding technique for achieving the highest levels of toughness with HSWs is to use a shielding gas composition consisting of mixtures of argon (Ar) and helium (He). Typical gas compositions range from about 25% He and 75% Ar to about 90% He and 10% Ar. Higher percentages of He are useful for out-of-position welding and improved weldability. This must be balanced with the tendency of He (being a light gas) to be easily swept away by wind currents during outdoor welding. This can be managed by using protective welding enclosures if necessary.

Advanced pulsed welding power supplies are important for achieving the HSW microstructure and achieving good weldability during field construction. Several examples of these power supplies are the Fronius TransPulse Synergic 5000, the Lincoln Power Wave 455, and the Miller PipePro 450.

A system for applying the HSWs to 5G girth welds in an embodiment of the invention includes the use of background currents of about 100 to 175 amps and pulse current magnitudes of about 475 to about 575 amps. Arc voltage typically ranges from about 16V to about 25V. Wire feed speeds range from about 275 ipm to about 575 ipm for 0.9 mm diameter wire. Shielding gas flow rates range from about 50 to about 80 cfh. Travel speeds range from about 25 ipm to about 50 ipm for root and hot pass welding. Travel speeds range from about 10 ipm to about 25 ipm for the fill passes and about 8 ipm to about 15 ipm for the cap pass. Filler wire diameters can range from 0.8 mm to about 1.4 mm. Heat inputs range from about 0.2 kJ/mm to about 0.5 kJ/mm for the root and hot pass and from about 0.4 kJ/mm to about 1.4 kJ/mm for the fill and cap passes. One skilled in the art of PGMAW can adjust the pulsing parameters to obtain the desired welding arc and weld pool that will suppress the Ni-caused weldability issues. This adjustment can be accomplished without resorting to the addition of $CO_2$ to the shielding gas as is typically practiced for pipeline girth welding.

As with all situations of weld procedure development when a new or challenging wire is involved, some experimentation is necessary to optimize weldability and to limit defect rate. Because many permutations are possible in combining welding variables, and because each welding scenario will involve different conditions of base metal thickness, bevel geometry, and weld position, it is not practical to prescribe one set of welding parameters that will be suitable for all applications of HSWs. Routine improvements in weldability can be made by manipulation of the wire feed speed, travel speed, shielding gas composition, torch oscillation, and general arc parameters like background current. Additional improvements are enabled with modern power sources by adjustment of the pulsing parameters. This includes, but is not limited to, adjustment of the following variables: pulse frequency, pulse magnitude, pulse width, and pulse shape. Due to the rapid response time of the modern electronics used for waveform control power supplies, fine adjustments of the pulsing shape can be made including the shape of pulse ramp up (current rise), peak pulse current, pulsing current time, overshoot, the shape during ramp down, tail-out speed, droplet detachment time, step-off current, droplet detachment current, and the pulse period (frequency). Producing variations such as combining a series of different pulses is also possible.

Figure 7:
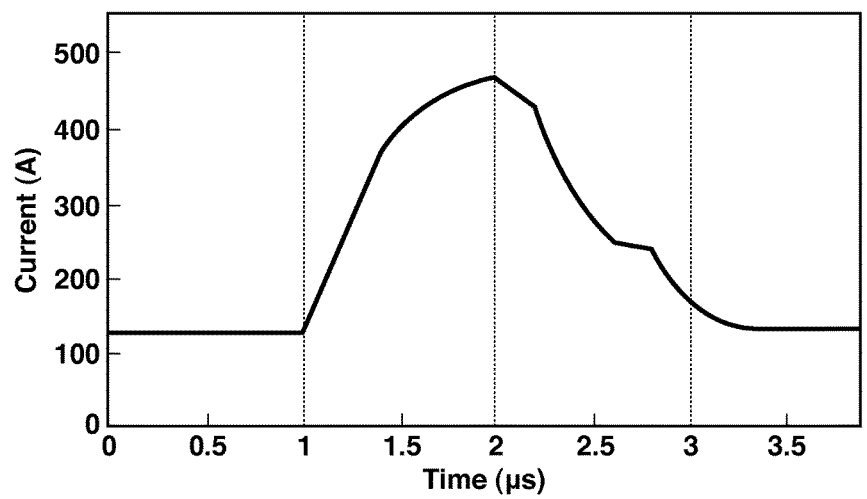
FIG. 7 is a plot of a GMAW pulse waveform useful in applying an embodiment of the Fe—Ni weld metals.

The product literature that accompanies modern waveform control power supplies contains guidance on how to make pulsing adjustments to enable specific arc characteristics and weld pool control. Pulsing adjustments can be used to modify the transfer mode, the droplet size, the droplet frequency, and to modify such factors as the turbulence of the weld pool, the weld contour, weld penetration, and the ability of the weld pool to wet smoothly into the base metal. In other words, pulsing adjustments can be used to improve weldability. The pulsing adjustments can also be used to reduce weld spatter. It is an expected and natural step during weld procedure development to adjust these parameters to improve weldability. FIG. 7 illustrates a pulse waveform generated by the inventors that is useful in applying an embodiment of the Fe—Ni weld metals. This waveform was evolved from one that the welding machine power source supplier recommended for welding stainless steel.

While the most demanding applications of the HSWs where the highest levels of toughness are needed utilize shielding gases without any oxygen potential, less demanding applications are able to use small amounts of $CO_2$ or oxygen in the shielding gas. Although weldability will improve, a tradeoff with toughness occurs. The inventors have experimented with using small amounts of $CO_2$ in the shielding gas of HSWs and it is believed that a practical limit for these applications exists at about 3% $CO_2$ or 2% oxygen.

In the case of very demanding applications where low weld metal oxygen content is desired for high toughness, special techniques can be used to modify the welding process to lower the oxygen potential. These techniques include purging the wire feed system of the welding torch with inert gas such as argon to eliminate air that might otherwise be feed into the arc. This can include argon flooding of the entire wire feeding mechanism from the wire spool and/or drive rolls to the contact tip. The concept is to remove all air from the wire feed system and welding torch. Another technique that can be used is to provide either prior cleaning of the weld wire or in-situ cleaning during actual wire feed. Cleaning can be done by abrasion (mechanical) or chemical methods including the use of ultrasonic vibration. Yet another technique to eliminate oxygen contamination from the welding environment involves flooding the weld arc region with argon or other inert gas. This can be accomplished by using any variety of gas shielding devices like diffusers, pre-shields or trail shields, as are known to those skilled in the art of welding processes. The welding torch region can be entirely covered by an argon backfilled containment structure.

Weld Pool Agitation

Weld pool agitation is another technique that can be used to mitigate or control the weld pool flow characteristics and viscosity related issues of Fe—Ni weld metals. Mechanical or ultrasonic vibration can be applied directly to the consumable wire or through an independent ceramic rod that contacts the molten weld pool. Weld pool agitation has a similar effect of reducing the surface tension of the weld pool which enables better weldability. Depending on the user's capabilities, welding equipment, and fabrication scenario, the agitation technique can be applied either in addition to, or in lieu of, using an advance waveform power supply.

Hybrid Laser Arc Welding

The HSWs can be applied using the hybrid laser arc welding (HLAW) process. In fact, the metallurgy of the HSWs is particularly beneficial in overcoming deficiencies of the HLAW process when applied to structural and/or pipeline steels. HLAW welds have high dilution in the lower portions of the weld metal near the root. In this region, the weld metal is mostly remelted base metal. Also, this region of the weld experiences a fast cooling rate. If routine structural steel or pipeline welding consumables are used with HLAW, then the high dilution chemistry tends to transform to martensite. This results in a hard, brittle weld deposit. As a solution to this problem, the HSW metallurgy works well in the martensitic condition and it provides the toughness necessary despite the constraints of the HLAW process. As explained above, dilution calculations can be used to formulate a suitable HSW filler wire for any application, and this includes HLAW of structural steels. Suitable filler wires can be formulated to produce the preferred weld metal chemistry. Low carbon composition weld wires (not greater than about 0.05%, more preferably not greater than 0.03%, and even more preferably not greater than 0.02%) are particularly useful in creating an appropriate metallurgy for HLAWs that achieves excellent combinations of strength and toughness.

Submerged Arc Welding

It is possible to deploy the HSW metallurgy using the submerged arc welding (SAW) process. One useful application in pipeline construction is that of double joining pipes in advance of the final laying operation. To accomplish the desired metallurgy with the SAW process, special fluxes are required to minimize the oxygen content of the weld. Such flux technology is described in the patent application US2008/0057341. This application describes welding technology for use in cryogenic applications and specifically for welding 9% Ni steels. As explained above, the key challenge for 9% Ni design is brittle fracture resistance at cryogenic temperatures (−196° C.). High tearing resistance is not a concern. On the contrary, high tearing resistance is key for SBD pipelines. For this reason, SAW welding of the HSW metallurgy must be restricted to oxygen levels lower than for US2008/0057341. When SAW welding the HSW metallurgy, oxygen contents must be kept below 200 ppm versus the 300 ppm restriction in US 2008/0057341. Depending on the design conditions, it may be necessary for SBD applications to restrict the oxygen below 150 ppm, or even 100 ppm. This can be done by increasing the basicity index (BI) of the flux, a term known to those skilled in the art or welding engineering, an index that reflects the basic vs. acidic qualities of the flux and its oxygen removing potential. A number of BI formulas are available, such as the well known Tuliani formula.

Because the application of double joining is conducted in the 1G (flat) welding position, this application does not have the weld metal viscosity problems of out-of-position welding. Therefore, the need for advanced power supplies is not as great as for girth welding in the 5G position. There exists a tradeoff between the limited position capabilities of SAW and the weld deposition rate. The deposition rate can be relatively high, but out-of-position welding is not possible.

Strain Based Design Engineering Critical Assessment (SBECA) for High Strain Welds Failure by ductile tearing in SBD applications is a relatively new design scenario for the pipeline industry, and girth welds have not previously been engineered to produce high levels of tearing resistance. The Strain-Based Design Engineering Critical Assessment (SBECA) technology discussed in this application above reinforces the importance of weld toughness for SBD pipelines where higher levels of ductile tearing resistance are useful. This topic is discussed in the following reference: D. P. Fairchild, et al, "Girth Welds for Strain-Based Design Pipelines", ISOPE Symposium on Strain Based Design, the 18th International Offshore and Polar Eng. Conf, (ISOPE-2008), Vancouver, Canada, Jul. 6-11, 2008, pp. 48-56.

To optimize HSWs for a particular application, a means of designing or selecting the appropriate weld properties is desirable. For SBD pipelines, the following references describe technology on which SBECA can be based and that can be used to relate tolerable weld defect size to such factors as applied loads and material properties: International Patent Application PCT/US2008/001753; K. Minnaar, et al, "Predictive FEA Modeling of Pressurized Full-Scale Tests", Proceedings of 17th International Offshore and Polar Engineering Conference, Lisbon, Portugal, 2007, pp. 3114-3120; S. Kibey, et al, "Development of a Physics-Based Approach for the Prediction of Strain Capacity of Welded Pipelines", Proceedings of 19th International Offshore and Polar Engineering Conference, Osaka, Japan, 2009; Kibey, S., et al, "Tensile Strain Capacity Equations for Strain-Based Design of Welded Pipelines", Proceedings of the 8th International Pipeline Conference, Calgary, Canada (2010). These references explain how the critical defect size in a weld (the largest defect that can be tolerated safely) can be calculated using SBECA technology based on input parameters such as applied loads or strain, the strength properties of the base metal and weldment, the toughness properties of the material in which the defect resides (typically the weld metal or heat affected zone), and the structural geometry. Alternatively, SBECA technology can be used to predict the toughness required to support a weld defect of a given size, given other input parameters such as applied loads, strength properties, and geometric details.

For SBD engineering, several candidate methods exist to measure material toughness including the Charpy V-notch test, the crack tip opening displacement (CTOD) test, the J-Integral method, and the curved wide plate test. Research has shown that it is difficult to use these methods to provide a reliable, predictive parameter relating defect size, applied loads, and toughness for predictions of structural performance in SBD scenarios. On the contrary, the SBECA technology above is capable of quantifying and predicting structural performance, and does so by using a toughness parameter called the R-curve. This toughness parameter is measured using a single edge notch tension (SENT) test as is known by those skilled in the art of mechanics of materials. References on R-curve testing include: G. W. Shen, et al, "Measurement of J-R Curves Using Single Specimen Technique on Clamped SE (T) Specimens", Proceedings of 19th International Offshore and Polar Engineering Conference, Osaka, Japan, pp. 92-99, 2009; W. Cheng, et al, "Test Methods for Characterization of Strain Capacity—Comparison of R-curves from SENT/CWP/FS Tests", Proceedings of 5th Pipeline Technology Conference, Ostend, Belgium, 2009; H. Tang, et al, "Development of the SENT Test for Strain-Based Design of Welded Pipelines", Proceedings of 8th International Pipeline Conference, Calgary, Canada, 2010.

Figure 8:
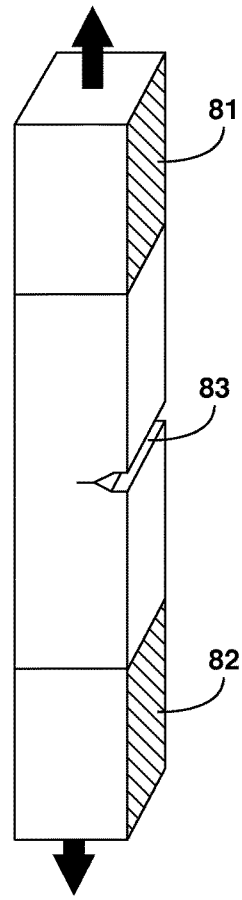
FIG. 8 is a drawing of a SENT specimen used to generate data for an R-curve.

FIG. 8 shows a schematic of a SENT specimen that can be used to measure an R-curve. Other geometries can be used as well. The SENT test specimen geometry is similar to a routine tensile test except that a defect (a crack or notch 83) is placed at mid-span. The specimen is gripped at gripping areas 81 and 82. The test procedure includes pulling the specimen in tension while monitoring and measuring the progression of defect growth until the specimen can no longer support significant increases in load. One method for generating an R-curve involves repeated loading and unloading of the specimen, where each successive loading cycle imposes increasing loads and (eventually) increasing crack extension. The progression of crack extension can be calculated from the compliance of the specimen, a technique consistent with that described in ASTM E1820. This technique is called the unloading compliance method and it can be used to relate crack growth to the applied loads; i.e., the driving force. The data collected can be used to plot an R-curve graph, which provides a graphical representation of the toughness, or more specifically, the materials resistance to ductile tearing. In other words, the graph characterizes the material's ductile fracture toughness.

While the SBECA technology referred to herein uses SENT testing and R-curves to characterize toughness, other methods can be used to quantify ductile fracture resistance as long as they provide a quantified, predictive ability to relate key parameters such as structural geometry, defect geometry, applied loads and material properties such as strength and toughness properties. One method is to conduct a series of full-scale pipe strain capacity tests, although this approach would be very expensive.

Figure 9:
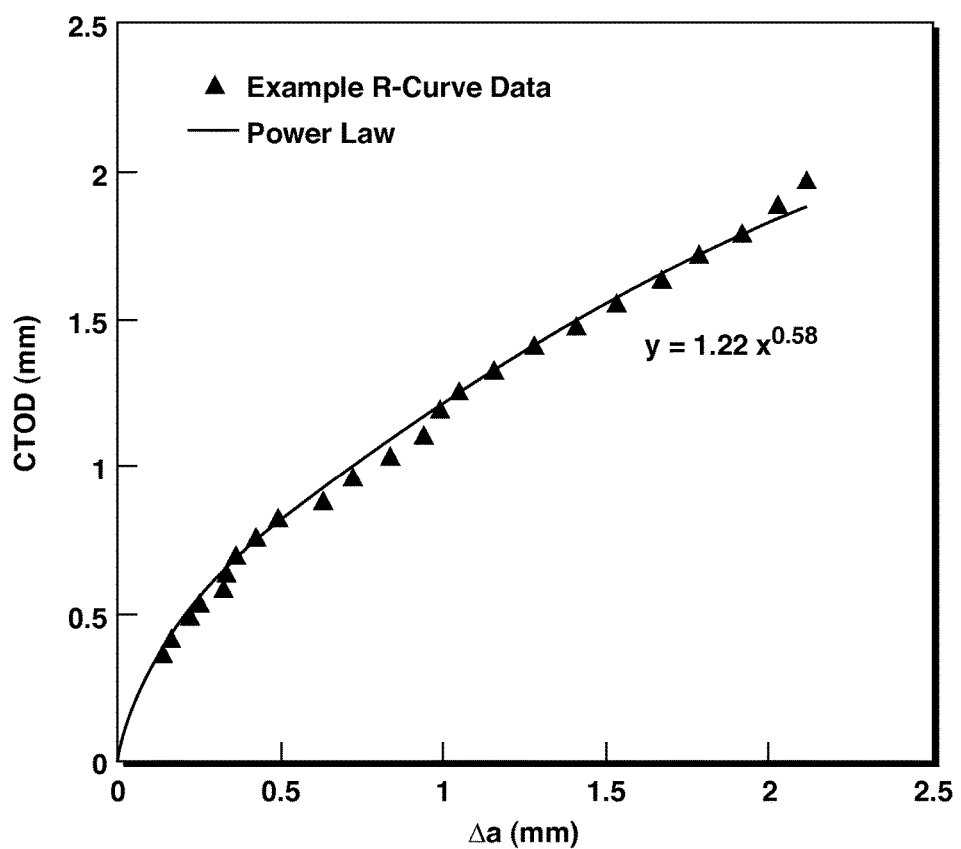
FIG. 9 is a graph of an example R-curve.

R-curve graphs show the relation between crack extension versus crack driving force. An example R-curve is shown in FIG. 9. As the crack extends, the material's resistance to crack growth (ductile tearing) generally rises. High toughness materials generate R-curves with steep slopes in the initial part of the curve and after the initial rise, the R-curve will continue to rise. The higher the R-curve (larger Y axis values), the higher the toughness. R-curves are sometimes called "delta a" (a) curves, or J-integral versus a curves, or CTOD vs. a curves where the crack driving force is expressed in terms of CTOD or J-integral and is plotted on the y-axis. Crack extension a (mm) is plotted on the x-axis. The curves can be represented by a mathematical relation such as $y=\delta \cdot x^\eta$, where (delta) and (eta) are factors in the power law fit of the CTOD (mm) versus a (mm) plot. According to this description of R-curves and ductile fracture resistance, the R-curves for different weld metals can be compared to judge toughness by considering the CTOD at a crack extension of 1 mm. There are two reasons to select a crack extension of 1 mm for such comparisons. First, when x=1 in the power law equation, the power term reduces to 1 and eta can be ignored. Then, the CTOD is equal to delta and comparisons can be made using only the value of delta. Second, 1 mm of crack growth is a reasonable degree of crack growth to compare toughnesses. According to SBECA knowledge, the strain capacity of pipe girth welds often occurs when crack extensions are on the order of 1 mm. Critical crack extensions can vary from very small values up to 1 mm or 2 mm, depending on many geometry and material property factors, but for the purposes of making general toughness comparisons, the 1 mm convention is adequate.

R-curves of the novel HSW weld metal can generate delta values of more than 1.0 at tensile strengths as high as 160 ksi. With good control of oxygen content or for the lower strength versions of the HSWs, delta values can be greater than 1.5. Depending on application, attention can be focused on optimal welding conditions as disclosed herein and delta values of 2.0 or higher can be achieved, preferably higher than 2.25, more preferably higher than 2.5, and even more preferably higher than 2.75. Depending on strength level and oxygen content, delta as high as 3.0 can be produced. The HSW weld metal can produce these high toughnesses while simultaneously providing high strengths suitable for overmatching X70 or stronger pipe grades for SBD pipelines.

The ability to accurately predict structural performance based on R-curve data and SBECA technology depends on validation of the technique using full-scale pipe strain capacity tests. This is discussed in the following references: International Patent Application PCT/US2008/001676; P. Gioielli, et al, "Large-Scale Testing Methodology to Measure the Influence of Pressure on Tensile Strain Capacity of a Pipeline, Proceedings of 17th International Offshore and Polar Engineering Conference, Lisbon, Portugal, 2007, pp. 3023-3027; P. C. Gioielli, et al, "Characterization of the Stable Tearing During Strain Capacity Tests", ISOPE Symposium on Strain Based Design, the 18th International Offshore and Polar Eng. Conference, (ISOPE-2008), Vancouver, Canada, Jul. 6-11, 2008, pp. 86-89; X. Wang, et al, "Validation of Strain Capacity Prediction Method—Comparison of Full-Scale Test Results to Predictions from Tearing Analysis Based on FEA", Proceedings of 5th Pipeline Technology Conference, Ostend, Belgium, 2009. Validation enables relating R-curve data to full-scale performance and this connection provides a calibration basis for parametric development of predictive mathematical expressions for SBECA.

Figure 10:
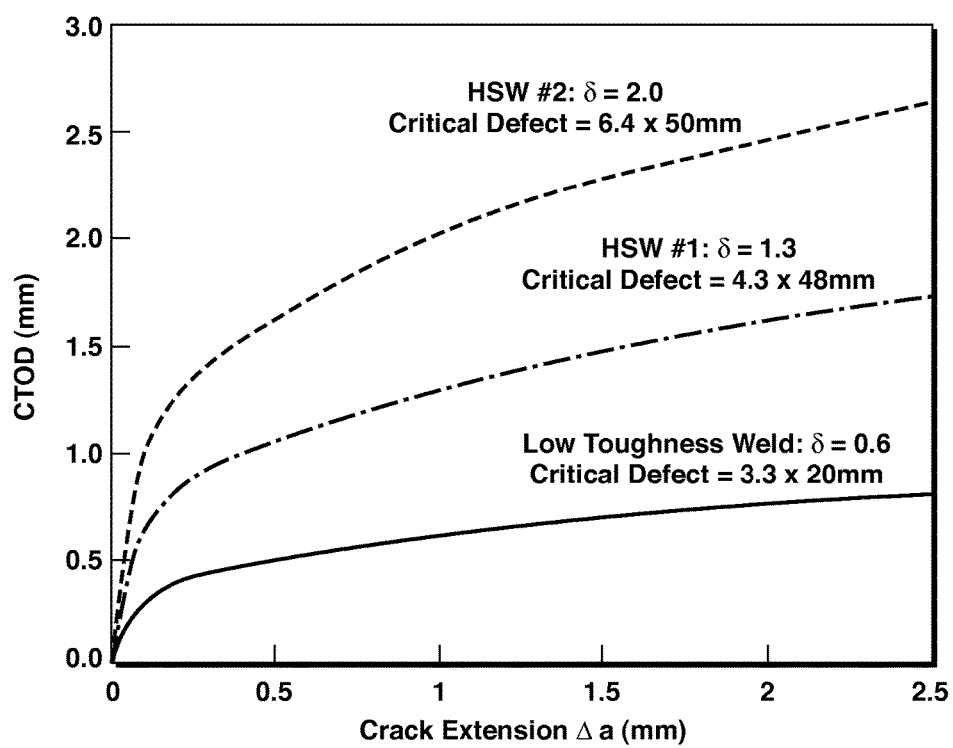
FIG. 10 is a graph of hypothetical R-curves for a low toughness X70 girth weld and two example high toughness HSWs.

The inventors have used the SBECA technology to quantify the effect of ductile fracture resistance in terms of R-curves for SBD scenarios involving a variety of pipe grades, defect sizes, weld properties, and base metal properties, including consideration of internal pipe pressure and pipe misalignment at the girth welds. A hypothetical example of the results from this work for an X70 girth weld is shown in FIG. 10. This example is for a 42 inch, 20 mm wall pipe with the following longitudinal tensile properties: yield strength of 75 ksi, ultimate tensile strength of 85.2 ksi, and a uniform elongation of 8%. The target strain capacity is 2.5%. Three hypothetical welds are considered, all with 20% UTS (ultimate tensile strength) overmatch and zero millimeters misalignment. For these three welds, the graph displays three different R-curves representing different levels of ductile tearing resistance (all other properties remaining equal). By considering the R-curve values at 1 mm of crack extension, the three curves have delta values of 0.6, 1.3, and 2.0. These levels of tearing resistance represent a relatively low toughness weld, and two HSWs called HSW #1 and HSW #2. Using the disclosed SBECA technology, critical defects can be calculated for these three R-curves. In terms of defect depth and length in millimeters, the three critical defect sizes associated with the three R-curves are 3.3×20 mm, 4.3×48 mm, and 6.4×50 mm, respectively. As can be seen, higher levels of tearing resistance provide greater defect tolerance. SBECA technology can be used as a design aid to select an optimum set of mechanical properties for HSWs.

HSWs can be designed to produce a range of strengths. Because strength and toughness are inversely related in structural steels, creating higher strength generally means producing lower toughness. For this reason, it is generally not desirable to create any more weld strength than is needed for the application because lower toughness is the tradeoff. SBECA technology can be used to design HSWs and optimize the tradeoff between strength and toughness.

Weld Metal Microstructure

Definitions of metallurgical terms describing the HSW microstructures may be found in the Glossary, while additional details are described in the following three references: (1) N. V. Bangaru, et al, "Microstructural Aspects of High Strength Pipeline Girth Welds," Proceedings of the $4^{th}$ International Pipeline Technology Conference, Ostend, Belgium, May 9-13, 2004, pp. 789-808, (2) J. Y. Koo, et al, "Metallurgical Design of Ultra-High Strength Steels for Gas Pipelines," ISOPE Symposium on High-Performance Materials in Offshore Industry, the 13th International Offshore and Polar Eng. Conference, (ISOPE-2003), Honolulu, Hi., USA, May 25-30, 2003, pp. 10-18, and (3) U.S. Pat. No. 6,565,678. As used herein, predominant or predominantly means at least about 50 volume percent.

Figure 11:
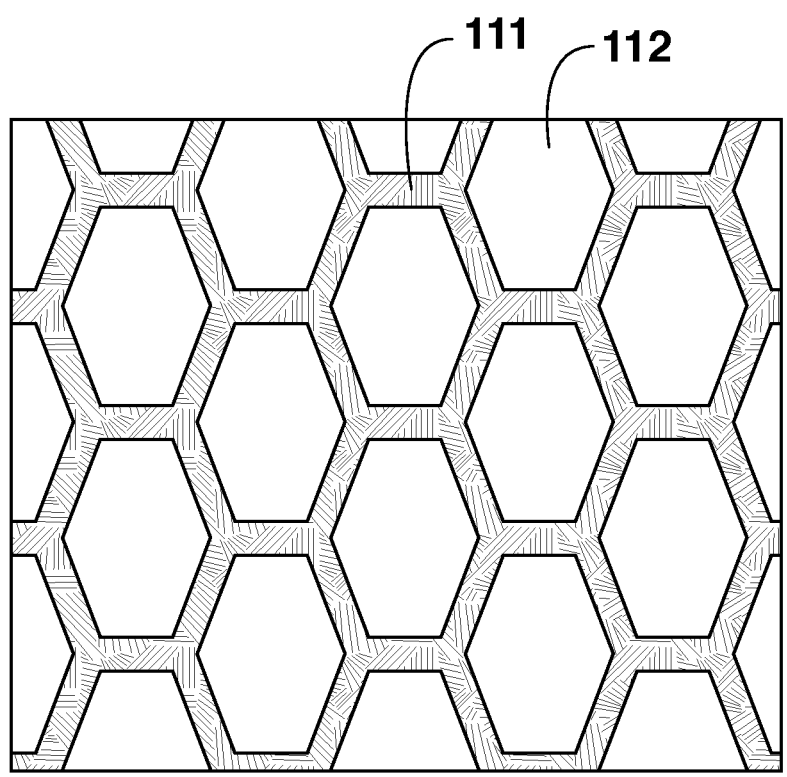
FIG. 11 is a drawing of the cellular microstructure of the weld metal of an embodiment of the invention.

In stress-based pipeline design, the microstructure of choice for girth welds is generally acicular ferrite. For the cryogenic applications described in U.S. Pat. No. 3,218,432 the microstructure is described as "low carbon martensite with traces of ferrite, bainite and austenite". The microstructure of the weld metal of this invention is different from both of these examples. The microstructure of the current invention is comprised of balanced volume fractions of martensite and bainite, significantly more than a trace of austenite, and no ferrite. The inventors have studied many variations of Fe—Ni microstructures of the invention in detail, and have discovered that the best combination of properties for the intended SBD application is achieved with a balanced proportion of predominantly lath martensite and several bainites along with a significant volume fraction of retained austenite. The weld metal possesses a cellular substructure due to solidification as primary austenite. A schematic of this microstructure is shown in FIG. 11. During weld cooling, transformation of the austenite occurs, and different constituents form in the cell walls 111 and cell interiors 112. Of the total volume fraction of the weld metal microstructure, the volume fraction in the cell walls is generally in the range of about 20% to 40%, while the volume fraction in the cell interiors is generally in the range of about 60% to 80%.

Due to chemical segregation during solidification, the cell walls are more hardenable and are harder than the cell interiors. For moderate strength HSWs, the cell walls contain mostly martensite while the interiors contain mostly bainite, specifically, degenerate upper bainite (DUB) and granular bainite (GB). The predominant martensitic constituent is lath martensite which can appear as-cooled (no interlath carbides), tempered from subsequent welds passes, or autotempered from self cooling. The tempering is evidenced by carbides within the laths. Spread randomly throughout the microstructure are small individual grains of retained austenite. Depending on the weld metal chemistry and the cooling rate during welding, other minor constituents are also produced including tempered martensite, twinned martensite, and lower bainite. Twinned martensite is typically found in the cell walls and lower bainite is typically found in the cell interiors.

According to the novel weld design, Table 1 lists volume fraction ranges of the various HSW microstructural constituents. The stronger versions of the HSWs are produced by higher alloy content and lower weld heat input. The stronger versions contain a higher volume fraction of martensitic constituents and less bainite. The microstructural change with strength is most notable in the cell interiors. For HSWs suitable for lower grade pipes like X60 to X70, the cell interiors are predominantly DUB and GB. HSWs for higher pipe grades like X80 and above are designed to contain increasing proportions of martensite in the cell interiors. As strength increases, larger proportions of tempered martensite and twinned martensite are also produced. Retained austenite is a designed phase intended to increase toughness. The retained austenite is generated due to the prescribed Ni content of the HSWs.

TABLE 1

Volume fractions of various microstructural constituents in HSWs.

| Location in Cells | Lath Martensite (LM) | Tempered Martensite (TM) | Twinned Martensite (TwM) | Degenerate Upper Bainite (DUB) | Granular Bainite (GB) | Lower Bainite (LB) | Retained Austenite (RA) |
|---|---|---|---|---|---|---|---|
| Wall | 50-90% | 0-10% | 5-10% | 0-5% | 0-5% | 0-5% | 0-10% |
| Interior | 5-10% | 20-40% | 0-5% | 20-50% | 10-50% | 5-30% | 0-10% |

Figure 12:
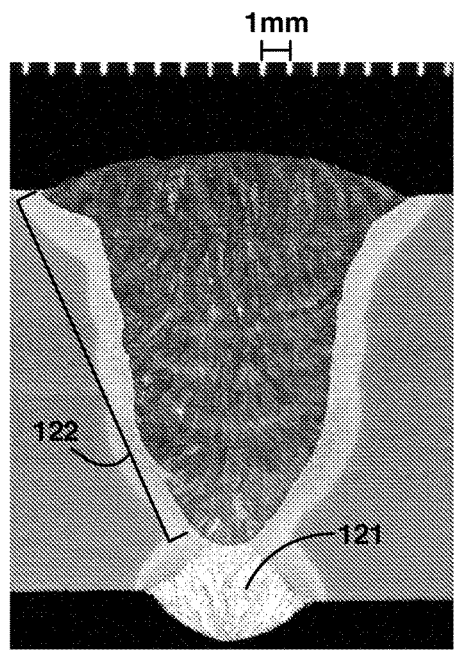
FIG. 12 is an optical macro image of a HSW.
Figure 13:
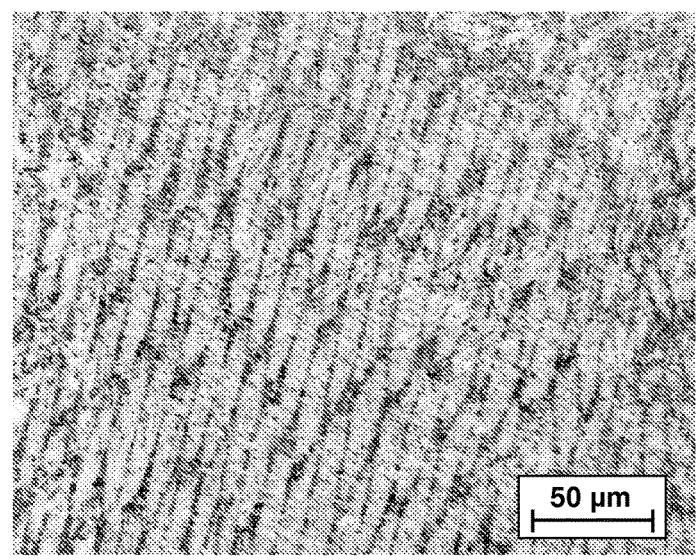
FIG. 13 is an optical micrograph of the cellular structure of a HSW.
Figure 16:
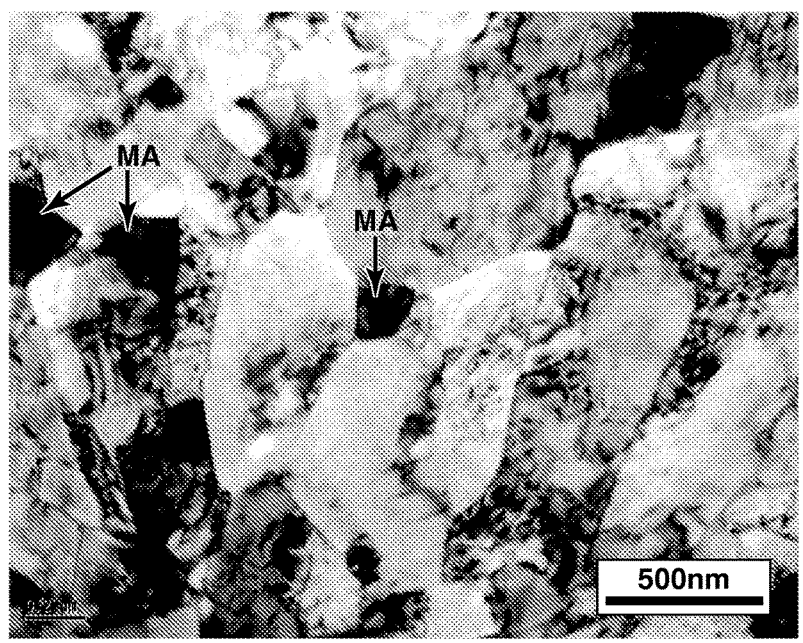
FIG. 16 is a transmission electron micrograph of granular bainite showing multiple grains of bainitic ferrite and scattered MA particles.
Figure 17:
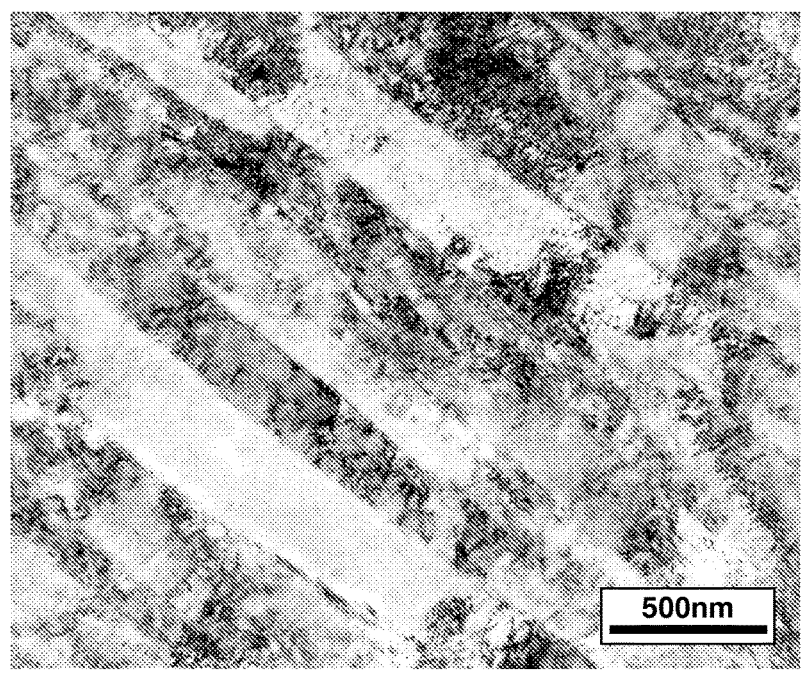
FIG. 17 is a transmission electron micrograph of lath martensite showing parallel dislocated laths and no MA at the lath boundaries.
Figure 18A:
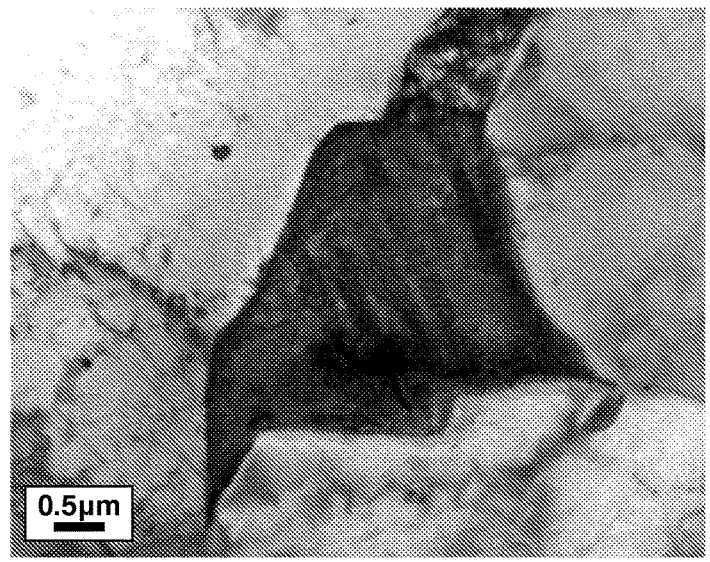
FIGS. 18A and 18B are transmission electron micrographs of retained austenite.
Figure 18B:
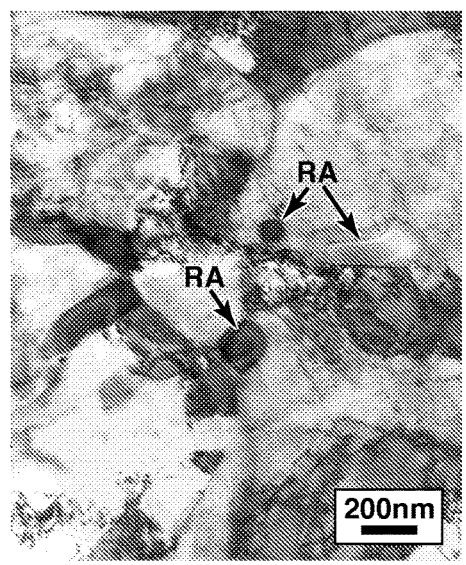

FIG. 12 illustrates an optical macro image of an embodiment of the HSW provided. This weld was produced by first applying a root pass using conventional internal pipeline welding technology and then the HSW passes were applied externally to complete the weld. Even at coarse magnification, FIG. 12 shows an obvious difference in microstructure between the conventional root pass 121 and the high strain weld metal 122 microstructure. FIG. 13 illustrates an optical micrograph of a HSW that demonstrates the cellular substructure. FIG. 14 shows a scanning electron micrograph showing the microstructure 141 at a cell wall in an Fe—Ni weld. FIGS. 15A and B, 16, 17, and 18A and B show examples of DUB, GB, LM, and RA, respectively, from a high strain weld. The martensite-austenite (MA) constituent is also identified in FIGS. 15A and B and 16.

Weld Inspection

The Fe—Ni welds described herein have advantages related to weld inspection. These welds are capable of ductility and toughness akin to austenitic (Ni-based) welds; however, the Fe—Ni weld is ferritic. Ni-based welding consumables produce austenitic welds which have a face centered cubic (FCC) atomic structure. The ferritic Fe—Ni weld has a body centered cubic (BCC) atomic structure which is useful in the welding of ferritic pipeline steels (which are also BCC in structure) because it avoids the problem of the dissimilar weld interface that occurs with using high Ni welding consumables to weld ferritic pipeline steels. Dissimilar weld interfaces cause difficulties in ultrasonic inspection, as these interfaces produce false signals which can result in unnecessary repairs.

EXAMPLES

The welding wires listed in Table 2 have been made by the inventors for experimentation of Fe—Ni welds.

TABLE 2

Weld wire chemistries

| Wire | C | Mn | Ni | Mo | Cu | Cr | Si | Ti | V | Zr | B | Co | Ce |
|---|---|---|---|---|---|---|---|---|---|---|---|---|---|
| 1 | 0.038 | 0.39 | 13.2 | | | | 0.015 | | | | | | |
| 2 | 0.049 | 0.37 | 13.3 | | | | 0.015 | | | | | | |
| 3 | 0.066 | 0.38 | 12.8 | | | | 0.015 | | | | | | |
| 4 | 0.056 | 0.38 | 9.5 | | | | 0.014 | | | | | | |
| 5 | 0.057 | 0.38 | 6.5 | | | | 0.015 | | | | | | |
| 6 | 0.059 | 0.40 | 13.2 | | | | 0.020 | | | | 0.0008 | | |
| 7 | 0.053 | 0.39 | 12.6 | | | | 0.014 | | | | | 2.2 | |
| 8 | 0.060 | 0.722 | 13.0 | | | | 0.011 | | | 0.030 | | | 0.030 |
| 9 | 0.060 | 0.722 | 13.0 | | | | 0.011 | | | 0.030 | | | 0.060 |
| 10 | 0.016 | 0.389 | 13.0 | | | | 0.011 | 1.0 | | | | | |
| 11 | 0.016 | 0.389 | 13.0 | | | | 0.011 | 2.0 | | | | | |
| 12 | 0.068 | 0.40 | 14.5 | 0.12 | | | | | | | | | |
| 13 | 0.072 | 0.40 | 14.5 | 0.12 | | | | | | | | 1.17 | |
| 14 | 0.072 | 0.40 | 14.5 | 0.12 | | | | | | | | | |
| 15 | 0.094 | 0.40 | 14.5 | 0.12 | | | | | | | | 1.17 | |
| 16 | 0.094 | 0.40 | 14.5 | 0.12 | | | | | | | | | |
| 17 | 0.108 | 0.55 | 14.8 | 0.12 | | | | | | | | | |
| 18 | 0.096 | 0.46 | 12.9 | 0.12 | | | | | 0.042 | | | | |
| 19 | 0.099 | 0.45 | 12.9 | 0.12 | | | | | 0.081 | | | | |
| 20 | 0.101 | 0.52 | 13.0 | 0.12 | | | 0.480 | | | | | | |
| 21 | 0.097 | 0.43 | 13.0 | 0.12 | 0.30 | | | | | | | | |
| 22 | 0.097 | 0.46 | 12.9 | 0.31 | | | | | 0.058 | | | | |
| 23 | 0.094 | 0.42 | 12.9 | 0.31 | | | 0.24 | | 0.060 | | | | |
| 24 | 0.098 | 0.42 | 12.9 | 0.31 | 0.29 | | 0.24 | | 0.060 | | | | |
| 25 | 0.095 | 0.43 | 12.8 | 0.31 | 0.29 | 0.35 | 0.25 | | 0.062 | | | | |
| 26 | 0.111 | 0.42 | 13.0 | 0.31 | 0.30 | | 0.25 | | 0.059 | | | | |
| 27 | 0.050 | 0.42 | 10.8 | | 1.0 | | | | | | | | |
| 28 | 0.049 | 0.47 | 10.8 | | 1.3 | | | | | | | | |
| 29 | 0.057 | 0.44 | 10.9 | | 1.2 | | | 0.007 | | 0.007 | | | |

Using wires 2, 4, and 12 several 5G girth welds were produced using the Fe—Ni technology disclosed herein. These welds were made on 30 inch diameter, 15.6 mm wall API 5L X80 pipe. This pipe was of the following composition by weight % (wt. %): Carbon: 0.06, Mn: 1.88, Si: 0.25, P: 0.006, S: 0.002, Ni: 0.17, Cu: 0.18, Mo: 0.22, Cr: none, Nb: 0.03, V: none, and Ti: 0.01. The welds were produced using CRC Evans automatic welding equipment which included use of a Fronius TransPulse Synergic 5000 power supply. The pulsing parameters were adjusted as disclosed herein, and good weldability was achieved along with excellent mechanical properties. Additional details about these welds are given in Tables 3 and 4.

TABLE 3

Welding Details and Mechanical Properties

| Weld | Wire | Weld Position | Helium (%) | Argon (%) | $CO_2$ (%) | Yield Strength (ksi) | UTS (ksi) | CVN (J) @ −20° C. | CTOD (mm) @ −20° C. |
|---|---|---|---|---|---|---|---|---|---|
| 1 | 2 | 5G | 70 | 30 | | 104 | 138 | 222 | 0.21 |
| 2 | 4 | 1G-rolled | 70 | 30 | | 110 | 124 | 192 | 0.38 |
| 3 | 12 | 5G | 70 | 30 | | 109 | 160 | 132 | 0.11 |
| 4 | 12 | 5G | 67 | 30 | 3 | 114 | 156 | 51 | 0.08 |

(CVN—Charpy V Notch)

TABLE 4

Weld Chemistries

| Weld # | Wire # | C | Mn | Ni | Mo | Cu | Cr | Si | V | O | Pcm |
|---|---|---|---|---|---|---|---|---|---|---|---|
| 1 | 2 | 0.037 | 0.48 | 12 | 0.021 | 0.028 | 0.028 | 0.03 | — | 76 | 0.267 |
| 2 | 4 | 0.054 | 0.9 | 6.6 | 0.084 | 0.07 | 0.044 | 0.1 | — | 58 | 0.229 |
| 3 | 12 | 0.061 | 0.56 | 14 | 0.12 | 0.027 | 0.027 | 0.051 | — | 69 | 0.336 |
| 4 | 12 | 0.058 | 0.56 | 13.9 | 0.13 | 0.029 | 0.028 | 0.048 | — | 240 | 0.33 |

Weld number 4 shows the affect of adding $CO_2$ to the shielding gas. This weld contained more oxygen than desired for a HSW (240 ppm) and the toughness properties were not as good as the HSWs made without $CO_2$ in the shielding gas.

Two full-scale pipe strain tests were conducted using X80 pipe and girth welds made using wire 12 in Table 1. The first full-scale specimen was pre-populated with 4×50 mm weld metal defects. The second full-scale test was populated with 3×50 mm defects. The first specimen was produced with no intentional high-low misalignment and the second specimen was produced with 3 mm of high-low misalignment. Both tests were pressurized to 72% of the specified minimum yield strength and pulled in tension to failure. These tests were conducted as explained in the previously cited references on full-scale pipe strain testing. The first test achieved in excess of 6% strain before the test was halted to protect the testing equipment. The second test achieved a strain capacity of 3% before the pipe material failed in plastic collapse.

As demonstrated by these examples, HSWs are useful in producing pipeline girth welds capable of achieving high toughnesses and high levels of applied strain even when containing common welding defects. HSWs with tensile strengths as high as 160 ksi can produce good brittle fracture resistance as evidenced by weld metal CTOD values above 0.10 mm at temperatures of −20° C. With attention paid to chemistry, oxygen content, and microstructure, HSWs can produce this strength and toughness at temperatures as low as −10° C., −15° C., −20° C., or even −30° C. or −40° C. or lower down to about −100° C. For HSWs with tensile strengths of about 120 ksi, CTOD values higher than 0.2 mm or 0.3 mm can be achieved. For HSWs with tensile strengths of about 110 ksi, CTOD values of higher than 0.3 to 0.5 mm can be achieved.

The transition temperature of HSWs as measured by the Charpy V-notch test can be made to produce ductile-to-brittle transition temperatures down to −20° C., −30° C., or −40° C. With attention paid to chemistry, oxygen content, and microstructure, transition temperatures as low as −60° C., −80° C., or even −100° C. can be achieved.

With respect to ductile fracture resistance, the HSWs can produce R-curves as high or higher than described by a curve where at a crack extension of 1 mm the delta value is at least 1.0. With attention paid to chemistry, oxygen content and microstructure, HSWs can produce R-curves as high or higher than a curve with a delta value of 1.5, preferably 2.0, more preferably higher than 2.25, even more preferably 2.5, and even higher than 2.75. Depending on strength level and oxygen content, delta values as high as 3.0 can be produced.

With the above described mechanical properties, the HSW girth welds can achieve global plastic strains greater than 0.5% while containing typical weld defects of sizes such as 2×25 mm, 3×50 mm, 4×50 mm, or 5×50 mm, or 6×50 mm, depending on wall thickness. The first dimension of these defects describes the flaw height in a direction perpendicular to the pipe surface and the second dimension (the larger dimension) is the flaw length along the hoop direction of the girth weld. Even long defects such as 2×100 mm or 1×200 mm can be supported while achieving plastic strains larger than 0.5%. Depending on defect size and pipe wall thickness, global plastic strains of 1%, 1.5%, 2%, 2.5%, 3% or even 4% or 5% can be achieved. High strain capacities can be achieved in pipe grades up to about X120.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

Glossary

Austenitic alloys: any of a group of engineering alloys such as stainless steel, Ni-based alloys, and duplex stainless steels that possess an austenitic microstructure characterized by a face centered cubic (fcc) atomic arrangement.

Ferritic alloys: any of a group of engineering alloys such as Fe—Ni alloys with up to about 15% Ni content or structural steels that possess a ferritic microstructure characterized by a predominantly body centered cubic (bcc) atomic arrangement. This includes a variety of steel microstructures that are predominantly martensite.

Yield strength: That strength corresponding to a departure from linear elastic behavior where load support is achieved without permanent deformation and plastic behavior where load support results in measurable permanent deformation.

Tensile strength: That strength corresponding to the maximum load carrying capability of the material in units of stress when the failure mechanism is not linear elastic fracture.

HAZ: Heat-affected-zone.

Pcm: A formula used to quantify hardenability based on the wt % of common alloying elements used in steel. Hardenability is the degree to which a steel transforms to martensite (a hard microstructure) when cooled from high temperatures.

$$Pcm = C + Si/30 + (Mn + Cu + Cr)/20 + Ni/60 + Mo/15 + V/10 + 5B.$$

The alloy content in wt. % is entered into the equation to calculate the Pcm number.

Heat-affected-zone: Base metal that is adjacent to the weld fusion line, is not melted during the welding operation, but that was affected by the heat of welding.

Toughness: Resistance to fracture.

Weldment: An assembly of component parts joined by welding.

Weldability: The feasibility of welding a particular metal or alloy. Sometimes weldability refers to the susceptibility of hydrogen induced cracking during welding, but in the context of this disclosure, weldability refers to the ease of welding without creating defects such as lack of fusion, lack of penetration, or undercut. A number of factors contribute to poor weldability including a high surface tension molten weld pool and an erratic or unstable welding arc. These factors create symptoms observed by the welder including poor wetting of the weld pool into the adjacent base metal, sharp (or small) reentrant angles at the weld toes, undesirable weld spatter.

Gas metal arc welding (GMAW): A welding process that utilizes a torch whereby the filler wire acts as the electrode, is automatically feed through a contact tip, and is consumed in the welding process. The contact tip is typically surrounded by a gas cup that directs shielding gas to the area of the welding arc. Common shielding gases are argon, CO2, helium, and oxygen. Torch travel can be provided by a machine (automatic or mechanized) or can be provided by a human (semiautomatic). The process name GMAW is a standard designation made by the American Welding Society.

Pulsed gas metal arc welding (PGMAW): A variation of the GMAW process that utilizes power sources that provide current pulsing capabilities. These are sometimes referred to as advanced current waveform power sources. The American Welding Society has termed PGMAW as GMAW-P.

GMAW-based processes: A number of allied processes similar to GMAW such as PGMAW, metal core arc welding (MCAW), and flux cored arc welding (FCAW). The primary difference with MCAW is that a cored wire is used and there exists metal powders within the core. The FCAW process also uses a cored wire and the core typically consists of flux powders. FCAW can be used with or without shielding gas.

Gas tungsten arc welding (GTAW): A welding process that utilizes a torch whereby the electrode is a non-consumable tungsten rod. The process can be performed with or without a filler wire. If without a filler wire, the process is referred to as autogenous. If a filler wire is used, it is fed from the side (as opposed to through the torch centerline as with the many other processes like GMAW) into the weld pool/arc region. Filler wire feed can be provided by a machine or by a human. Weld torch travel can be provided by a machine or by a human. The tungsten electrode is surrounded by a gas cup that directs shielding gas to the weld pool/arc region. Typical shielding gases include argon and helium.

Hybrid-laser arc welding (HLAW): A process that combines laser welding and GMAW. Typically the laser precedes the GMAW arc to provide deep penetration. The GMAW component of HLAW creates the ability to accommodate larger variations in joint fit up as compared to laser welding alone. Whereas a laser can only bridge gaps of very narrow widths (~1 mm), GMAW welding can bridge gaps of several millimeters.

Submerged arc welding (SAW): A welding process that requires a continuously fed consumable solid or tubular (flux cored) electrode. The molten weld and the arc zone are protected from atmospheric contamination by being "submerged" under a blanket of granular fusible flux.

Low oxygen welding environment: A welding process whereby the protection afforded to the molten weld pool achieves a weld metal oxygen content of less than about 200 ppm oxygen. The protection can be achieved by use of a shielding gas or a flux.

Proeutectoid ferrite (PF): In reference to steel weld microstructures, this phase is also called polygonal ferrite and grain boundary ferrite. PF tends to be one of the first; if not the first phase to transform from the austenite as the weld metal cools from high temperatures. Nucleation occurs at the prior austenite grain boundaries; therefore the PF grains are located on these boundaries. The grains can take on a polygonal shape or sometimes sideplates will form from the allotriomorphs which then defines a related phase called Widmanstätten ferrite.

Acicular ferrite (AF): AF is often the first decomposition product to transform in a steel weld from the austenite during cooling, although proeutectoid ferrite (polygonal ferrite) can sometimes form first. AF nucleates on small, non-metallic inclusions and then experiences rapid growth by a bainitic-type transformation mechanism. The AF grains typically exhibit a needle-like morphology with aspect ratios ranging from about 2:1 to 20:1 depending on cooling rate and chemistry. This transformation involves both shear and diffusional components. The transformation temperature controls the interplay between the diffusional and shear components, thus determining AF morphology.

Granular bainite (GB): Refers to a cluster of 3 to 5 relatively equiaxed bainitic ferrite grains that surround a centrally located, small "island" of Martensite Austenite (MA). Typical "grain" diameters are about 1-2m.

Upper bainite (UB): Refers to a mixture of acicular or laths of bainitic ferrite interspersed with stringers or films of carbide phase such as cementite. It is most common in steels with carbon contents higher than about 0.15 wt %.

Degenerate upper bainite (DUB): A bainitic product where each colony grows by shear stress into a set (packet) of parallel laths. During and immediately after lath growth, some carbon is rejected into the interlath austenite. Due to the relatively low carbon content, carbon enrichment of the entrapped austenite is not sufficient to trigger cementite plate nucleation. Such nucleation does occur in medium and higher carbon steels resulting in the formation of classical upper bainite (UB). The lower carbon enrichment at the interlath austenite in DUB results in formation of martensite or martensite-austenite (MA) mixture or can be retained as retained austenite (RA). DUB can be confused with classical upper bainite (UB). UB of the type first identified in medium carbon steels decades ago consists of two key features; (1) sets of parallel laths that grow in packets, and (2) cementite films at the lath boundaries. UB is similar to DUB in that both contain packets of parallel laths; however, the key difference is in the interlath material. When the carbon content is about 0.15-0.40, cementite (Fe3C) can form between the laths. These "films" can be relatively continuous as compared to the intermittent MA in DUB. For low carbon steels, interlath cementite does not form; rather the remaining austenite terminates as MA, martensite, RA, or mixtures thereof.

Lower bainite (LB): LB has packets of parallel laths similar to DUB. LB also includes small, intra-lath carbide precipitates. These plate-like particles consistently precipitate on a single crystallographic variant that is oriented at approximately 55° from the primary lath growth direction (long dimension of the lath).

Lath martensite (LM): LM appears as packets of thin parallel laths. Lath width is typically less than about 0.5 m. Untempered colonies of martensitic laths are characterized as carbide free, whereas auto-tempered LM displays intra-lath carbide precipitates. The intralath carbides in autotempered LM form on more than one crystallographic variant, such as on 110 planes of martensite. Often the cementite is not aligned along one direction; rather it precipitates on multiple planes.

Tempered martensite (TM): TM refers to the heat treated form of martensite in steels whereby the heat treatment is performed in furnace or by local means such as using heating wrap. This form of tempering is conducted after welding fabrication. The microstructure and mechanical properties change as the metastable structure martensite incurs the precipitation of cementite during excursions in a temperature range where cementite precipitation is possible, but too low for austenite formation.

Auto-tempered lath martensite: martensite that incurs self-tempering during cooling from an operation such as welding. Cementite precipitation occurs in-situ, on cooling, and without reheating as is done for traditional tempering.

Twinned Martensite (TwM): This version of martensite forms due to a higher carbon content compared to chemistries that contains mostly lath martensite. TwM forms when the carbon content is above about 0.35% to 0.44%. Below this carbon level, lath martensite is predominant. TwM contains internal twins that have formed to accommodate transformation deformations and stresses. Typical structural steels do not contain high carbon contents; therefore, TwM in structural steels (particularly welds) is mostly found in regions of chemical segregation. Segregation can create local areas of high carbon concentration, thus leading to TwM. This is often the case in areas of MA in welds and heat affected zones.

Martensite austenite constituent (MA): Remnant areas of microstructure in a ferritic steel or weld that transform on cooling to a mixture of martensite and retained austenite. These areas are often the last regions to transform on cooling. MA regions are stabilized due to carbon rejection from surrounding areas that have already transformed at higher temperatures. Due to stabilization, the transformation of austenite to MA occurs at lower temperatures than the surrounding areas. Regions of MA are typically dominated by martensite while only containing small volume fractions of retained austenite (less than 10%). MA is often seen on prior austenite grain boundaries of welds or HAZs that experience double thermal cycles. MA is also found on lath boundaries in the lath based microstructures of degenerate upper bainite and lower bainite. MA is typically observed on any number of lath, packet or grain boundaries present in structural steels.

Retained Austenite: Austenite that remains in the steel microstructure after cooling to room temperature. Austenite is stable at high temperatures, but once the microstructure cools below the A3 and A1 temperatures, lower temperature transformation products, such as ferrite, bainite and martensite, become stable and form from the austenite. Depending on cooling rate and chemistry, some small areas of the microstructure can become enriched in alloys (mostly carbon) and they remain stable and present at room temperature.

Engineering Critical Assessment (ECA): Methods for designing, qualifying, or otherwise assessing the structural significance of material defects, such as cracks or weld defects. One goal is to prevent structural failure. Another goal is prevent unnecessary repairs when the defects are analyzed to be benign. ECA methods are often based on fracture mechanics technology. ECA methods are capable of defining the critical conditions for failure based on, generally, three inputs: material properties, applied loads, and defect size. ECA is often used to predict the critical value of one parameter based on input of the other two. Other names for ECA methods include defect assessment procedures and fitness-for-purpose analysis.

Strain Based Engineering Critical Assessment (SBECA): Methods to determine the flaw tolerance of pipeline girth welds to applied tensile strains. This may mean characterizing ductile fracture resistance by experiments and then calculating acceptable flaw sizes based on a target strain demand. Alternatively, a target strain demand and flaw size can be used to calculate required ductile fracture resistance. SBECA requires knowledge or assumptions regarding several material properties including yield and tensile strengths. Often assumptions are necessary regarding the accuracy of non-destructive inspection techniques.

Critical defect size: Reference to a material defect, such as a crack or weld defect, in an engineering structure where this defect is the smallest defect that will cause failure depending on the specifics of pipe and weld mechanical properties, defect geometry, structural geometry, and applied loads. This term is commonly used when discussing engineering critical assessment (ECA).

High-Low Misalignment: the degree of geometric offset between adjacent pipe pieces at a girth weld. Misalignment varies around the pipe circumference. While best efforts are made to minimize misalignment, the magnitude of high-low can be fractions of a millimeter up to several millimeters. 1 mm of high-low would be considered small for large diameter pipe (say, for >24" diameter pipe), while >3 mm of high-low would be considered large. High-low misalignment rarely exceeds about 5 mm.

The invention claimed is:

1. A weld comprising a weld metal for ferritic steel base metals, said weld metal comprising:
    between 0.02 and 0.12 wt % carbon;
    between 7.50 and 14.50 wt % nickel;
    not greater than 1.00 wt % manganese;
    not greater than 0.30 wt % silicon;
    not greater than 150 ppm oxygen;
    not greater than 100 ppm sulfur;
    not greater than 75 ppm phosphorus; and
    the balance iron,
    wherein the weld metal comprises retained austenite and further comprises a cellular microstructure comprising cell walls having a volume fraction in the range of from 20% to 40% based on the total volume fraction of the weld metal and cell interiors having a volume fraction in the range of from 60% to 80% based on the total volume fraction of the weld metal, and wherein the cell walls are harder than the cell interiors and said weld metal in the weld has been applied using a gas metal arc welding process with pulsed waveform power supply.

2. The weld metal of claim 1 wherein the weld metal further comprises between 0.5 and 10 vol. % retained austenite.

3. The weld metal of claim 2 wherein the weld metal has a tensile strength greater than 110 ksi and R-curve toughness higher than a curve represented by a delta value greater than 1.0.

4. The weld metal of claim 3 wherein 50 or more percent of the volume of the cell walls comprises lath martensite and 20 or more percent of the volume of the cell interiors comprises degenerate upper bainite.

5. The weld metal of claim 4 further comprising at least one of the following:
    not greater than 0.30 wt % copper,
    not greater than 0.04 wt % vanadium,
    not greater than 0.30 wt % chromium,
    not greater than 0.40 wt % molybdenum,
    not greater than 0.04 wt % niobium,
    not greater than 0.02 wt % titanium,
    not greater than 0.02 wt % zirconium,
    not greater than 20 ppm boron.

6. The weld metal of claim 4 wherein said weld metal is applied using a shielding gas comprising helium and argon.

7. The weld metal of claim 6 wherein said shielding gas comprising helium and argon is substantially oxygen free.

8. The weld metal of claim 7 wherein said helium comprises 25 or more volume percent of said shielding gas.

9. A weld comprising a weld metal for ferritic steel base metals, said weld metal comprising:
   between 0.02 and 0.12 wt % carbon;
   between 7.50 and 14.50 wt % nickel;
   not greater than 1.00 wt % manganese;
   not greater than 0.30 wt % silicon;
   not greater than 100 ppm sulfur;
   not greater than 75 ppm phosphorus; and
   the balance iron,
   wherein the weld metal has a tensile strength greater than 110 ksi and R-curve toughness higher than a curve represented by a delta value greater than 1.0; the weld metal comprises between 0.5 and 10 vol. % retained austenite and further comprises a cellular microstructure comprising cell walls having a volume fraction in the range of from 20% to 40% based on the total volume fraction of the weld metal and cell interiors having a volume fraction in the range of from 60% to 80% based on the total volume fraction of the weld metal, and wherein 50 or more percent of the volume of the cell walls comprises lath martensite and 20 or more percent of the volume of the cell interiors comprises degenerate upper bainite and the cell walls are harder than the cell interiors; and said weld metal in the weld has been applied using a gas metal arc welding process with pulsed waveform power supply and a shielding gas comprising helium, argon, and $CO_2$ wherein helium comprises 25 or more volume percent of said shielding gas and $CO_2$ comprises not greater than 3 volume percent of said shielding gas.

10. A method of welding ferritic steel pipelines comprising:
   determining a desired HSW weld metal chemistry comprising between 0.02 and 0.12 wt % carbon, between 7.50 and 14.50 wt % nickel, not greater than 1.00 wt % manganese, not greater than 0.30 wt % silicon, not greater than 150 ppm oxygen, not greater than 100 ppm sulfur, not greater than 75 ppm phosphorus, and the remainder essentially iron,
   determining a welding consumable wire chemistry from a calculation using as inputs a pipeline base metal chemistry and a desired weld metal chemistry,
   welding the pipeline base metal using the welding consumable wire, further comprising the steps of:
      controlling the weld pool oxygen content to achieve a target weld metal oxygen content that is not greater than 150 ppm oxygen, and
      controlling the weld pool characteristics and arc stability during welding to provide satisfactory weldability, wherein the weld metal has a cellular microstructure comprising cell walls having a volume fraction in the range of from 20% to 40% based on the total volume fraction of the weld metal and cell interiors having a volume fraction in the range of from 60% to 80% based on the total volume fraction of the weld metal, and wherein the cell walls are harder than the cell interiors.

11. The method of claim 10 wherein the step of welding the pipeline base metal comprises a gas metal arc welding process with pulsed waveform power supply, the step of controlling the weld pool oxygen content comprises a welding shielding gas substantially free of oxygen and $CO_2$, and the step of controlling the weld pool flow characteristics and arc stability comprises welding current waveform control sufficient to provide satisfactory weldability.

12. A method of welding ferritic steel pipelines comprising:
   determining a desired HSW weld metal chemistry comprising between 0.02 and 0.12 wt % carbon, between 7.50 and 14.50 wt % nickel, not greater than 1.00 wt % manganese, not greater than 0.30 wt % silicon, not greater than 100 ppm sulfur, not greater than 75 ppm phosphorus, and the remainder essentially iron,
   determining a welding consumable wire chemistry from a calculation using as inputs a pipeline base metal chemistry and a desired weld metal chemistry,
   welding the pipeline base metal using the welding consumable wire and a gas metal arc welding process with pulsed waveform power supply, further comprising the steps of:
      controlling the weld pool oxygen content using a welding shielding gas comprising not greater than 3 volume percent of $CO_2$ to achieve a target weld metal oxygen content, and
      controlling the weld pool characteristics and arc stability during welding with welding current waveform control sufficient to provide satisfactory weldability, wherein the weld metal has a cellular microstructure comprising cell walls having a volume fraction in the range of from 20% to 40% based on the total volume fraction of the weld metal and cell interiors having a volume fraction in the range of from 60% to 80% based on the total volume fraction of the weld metal, and wherein 50 or more percent of the volume of the cell walls comprises lath martensite and 20 or more percent of the volume of the cell interiors comprises degenerate upper bainite and the cell walls are harder than the cell interiors.

13. The method of claim 12 wherein the weld metal further comprises at least one of the following:
   not greater than 0.30 wt % copper,
   not greater than 0.04 wt % vanadium,
   not greater than 0.30 wt % chromium,
   not greater than 0.40 wt % molybdenum,
   not greater than 0.04 wt % niobium,
   not greater than 0.02 wt % titanium,
   not greater than 0.02 wt % zirconium,
   not greater than 20 ppm boron.

14. The method of claim 12 wherein the welding shielding gas comprises helium and argon.

15. The method of claim 14 wherein helium comprises 25 or more volume percent of said shielding gas.

16. The method of claim 10 wherein the step of welding the base metal comprises hybrid laser arc welding.

17. The method of claim 10 wherein the step of welding the base metal comprises submerged arc welding.

18. The method of claim 10 wherein the step of welding the base metal comprises Tip TIG welding.

19. The method of claim 10 wherein the step of controlling the weld pool characteristics comprises weld pool agitation.

* * * * *